(12) United States Patent
Boegli et al.

(10) Patent No.: US 11,220,083 B2
(45) Date of Patent: Jan. 11, 2022

(54) TOOL AND METHOD FOR EMBOSSING PACKAGING MATERIAL WITH AN EMBOSSING PATTERN HAVING A CODE WITH LOW VISIBILITY AND METHOD OF READING A CODE

(71) Applicant: Boegli-Gravures SA, Marin-Epagnier (CH)

(72) Inventors: Charles Boegli, Marin-Epagnier (CH); Alain Droz, Marin-Epagnier (CH); Werner Steffen, Marin-Epagnier (CH)

(73) Assignee: Boegli-Gravures S.A., Marin-Epagnier (CH)

( * ) Notice: Subject to any disclaimer, the term of this patent is extended or adjusted under 35 U.S.C. 154(b) by 0 days.

(21) Appl. No.: 16/635,851

(22) PCT Filed: Jul. 30, 2018

(86) PCT No.: PCT/IB2018/055678
§ 371 (c)(1),
(2) Date: Jan. 31, 2020

(87) PCT Pub. No.: WO2019/025940
PCT Pub. Date: Feb. 7, 2019

(65) Prior Publication Data
US 2021/0129478 A1    May 6, 2021

(30) Foreign Application Priority Data
Aug. 3, 2017    (EP) .................................... 17184758

(51) Int. Cl.
*B31F 1/07*    (2006.01)
*B44B 5/02*    (2006.01)

(52) U.S. Cl.
CPC ................ *B31F 1/07* (2013.01); *B44B 5/026* (2013.01); *B31F 2201/0728* (2013.01);
(Continued)

(58) Field of Classification Search
CPC ................ B31F 1/07; B31F 2201/0728; B31F 2201/0733; B31F 2201/0738; B31F 2201/0743; B44B 5/026
See application file for complete search history.

(56) References Cited

U.S. PATENT DOCUMENTS

| | | | |
|---|---|---|---|
| 5,007,271 A | 4/1991 | Boegli | |
| 5,598,774 A | 2/1997 | Boegli | |
| (Continued) | | | |

FOREIGN PATENT DOCUMENTS

| | | | |
|---|---|---|---|
| AU | 772613 B2 | 5/2004 | |
| CA | 2367423 C | 9/2000 | |
| (Continued) | | | |

OTHER PUBLICATIONS

International Search Report for PCT/IB2018/055678 dated Jan. 18, 2019.
Written Opinion for PCT/IB2018/055678 dated Jan. 18, 2019.

*Primary Examiner* — David H Banh
(74) *Attorney, Agent, or Firm* — Andre Roland S.A.; Nikolaus Schibli

(57) ABSTRACT

An embossing tool for embossing a combined embossing pattern into a packaging material, the combined embossing pattern including decoratively embossed structure and at least one embossed code, the embossing tool including a male and a female embossing device for cooperating with each other, embossing structures of the male and female embossing device formed to produce the combined embossing pattern into the packaging material in an embossing gap, the embossing structures of the male and the female embossing device include first embossing structures intended for making the at least one embossed code, which are inverse congruent male and female embossing structures having a polyhedral shape, and the decoratively embossed structures and the at least one embossed code produced by the emboss-
(Continued)

ing structures are arranged such that the at least one embossed code has a reduced visibility as compared to the decoratively embossed structures.

20 Claims, 29 Drawing Sheets

(52) U.S. Cl.
CPC ............... *B31F 2201/0733* (2013.01); *B31F 2201/0738* (2013.01); *B31F 2201/0743* (2013.01)

(56) References Cited

U.S. PATENT DOCUMENTS

| | | | |
|---|---|---|---|
| 6,176,819 | B1 | 1/2001 | Boegli et al. |
| 6,665,998 | B1 | 12/2003 | Boegli |
| 6,715,411 | B1 | 4/2004 | Boegli |
| 7,036,347 | B2 | 5/2006 | Boegli |
| 7,147,453 | B2 | 12/2006 | Boegli |
| 7,229,681 | B2 | 6/2007 | Boegli |
| 8,038,922 | B2 | 10/2011 | Boegli |
| 8,430,663 | B2 | 4/2013 | Boegli |
| 8,495,900 | B2 | 7/2013 | Boegli |
| 8,932,044 | B2 | 1/2015 | Boegli |
| 9,140,834 | B2 | 9/2015 | Boegli |
| 9,156,107 | B2 | 10/2015 | Boegli et al. |
| 9,180,643 | B2 | 11/2015 | Boegli |
| 9,481,141 | B2 | 11/2016 | Boegli |
| 9,505,167 | B2 | 11/2016 | Boegli |
| 9,579,924 | B2 | 2/2017 | Boegli |
| 9,636,885 | B2 | 5/2017 | Boegli et al. |
| 9,809,927 | B2 | 11/2017 | Boegli |
| 9,939,725 | B2 | 4/2018 | Boegli et al. |
| 9,993,895 | B2 | 6/2018 | Boegli et al. |
| 10,083,253 | B2 | 9/2018 | Boegli et al. |
| 10,183,318 | B2 | 1/2019 | Boegli et al. |
| 2004/0209050 | A1* | 10/2004 | Andersson ............... B32B 37/12 428/172 |
| 2004/0231782 | A1 | 11/2004 | Scharner et al. |
| 2005/0279147 | A1 | 12/2005 | Boegli |
| 2005/0280182 | A1* | 12/2005 | Boegli .................... B29C 59/04 264/284 |
| 2007/0289701 | A1* | 12/2007 | Boegli ...................... B31F 1/07 156/209 |
| 2010/0061619 | A1 | 3/2010 | Boegli |
| 2010/0274256 | A1* | 10/2010 | Ritchey ................... A61B 34/20 606/96 |
| 2012/0018993 | A1 | 1/2012 | Boegli et al. |
| 2012/0292821 | A1* | 11/2012 | Boegli ...................... B31F 1/07 264/293 |
| 2013/0069276 | A1* | 3/2013 | Boegli ...................... B31F 1/07 264/293 |
| 2013/0273322 | A1* | 10/2013 | Boegli ................. B44B 5/0047 428/156 |
| 2014/0059977 | A1 | 3/2014 | Boegli |
| 2016/0075077 | A1* | 3/2016 | Boegli ..................... G06K 1/12 206/457 |
| 2016/0200066 | A1* | 7/2016 | Boegli ...................... B31F 1/07 101/28 |
| 2017/0066079 | A1 | 3/2017 | Boegli et al. |
| 2017/0237960 | A1* | 8/2017 | Kamm ................. H04N 5/2226 348/46 |
| 2017/0282635 | A1 | 10/2017 | Boegli et al. |
| 2018/0033128 | A1* | 2/2018 | Sobieranski ......... G03H 1/0443 |
| 2018/0075612 | A1* | 3/2018 | Michielin .......... G02B 23/2461 |
| 2018/0220698 | A1 | 8/2018 | Boegli et al. |
| 2018/0370175 | A1 | 12/2018 | Boegli et al. |

FOREIGN PATENT DOCUMENTS

| | | |
|---|---|---|
| CA | 2382597 A1 | 11/2000 |
| CH | 708200 A2 | 12/2014 |
| DE | 202017105458 U1 | 10/2017 |
| EP | 1181152 B1 | 3/2004 |
| EP | 2572820 A1 | 3/2013 |
| EP | 2653301 A1 | 10/2013 |
| EP | 3127435 A1 | 2/2017 |
| EP | 3251825 A1 | 12/2017 |
| EP | 3300612 A1 | 4/2018 |
| EP | 3415306 A1 | 12/2018 |
| WO | WO 2003/104890 | 6/2003 |
| WO | WO 2007/012215 | 2/2007 |

* cited by examiner

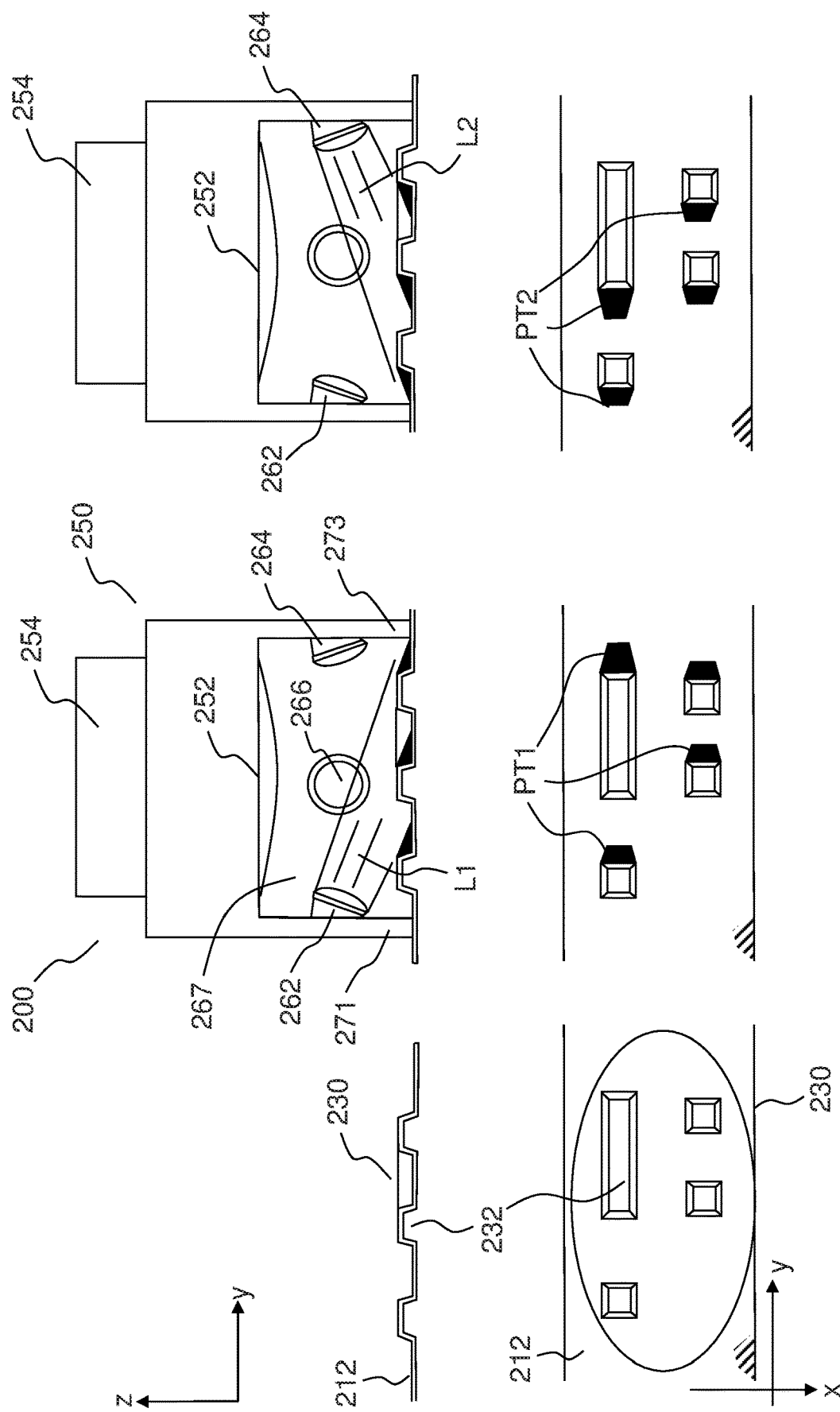

TOOL AND METHOD FOR EMBOSSING PACKAGING MATERIAL WITH AN EMBOSSING PATTERN HAVING A CODE WITH LOW VISIBILITY AND METHOD OF READING A CODE

CROSS REFERENCE TO RELATED APPLICATIONS

The present application is a United States national stage application of International patent application PCT/IB2018/055678 filed on Jul. 30, 2018 designating the United States, and claims foreign priority to European patent application EP17184758.5 filed on Aug. 3, 2017, the contents of both documents being herewith incorporated by reference in their entirety.

FIELD OF THE INVENTION

The present invention is related to the field of embossing tools for packaging material, for example packaging foils and papers, and the field of applying a code by embossing into packaging material, and methods and devices for reading such codes.

BACKGROUND

The present invention relates to a method and a device for the authentication of identification marks applied onto a packaging foil, wherein the identification marks can be in the form of a bar code or a matrix code, the identification mark having a reduced visibility by human eye, to an embossing device for carrying out the method and to a packaging foil produced according to the method.

A very large number of methods exist for the authentication of a plurality of identification marks on the most varied of goods and their packaging. The present invention relates to a method for the authentication of goods, such as e.g., foodstuffs, electronic equipment and in particular smokers' products such as cigarettes or cigars, which are arranged in a packaging. In EP 1 867 470 B1 of the same applicant, this reference herewith incorporated by reference in its entirety, a method and a device are disclosed for the authentication of identification marks embossed onto a packaging foil, wherein on the one hand in addition to the embossing of identification marks, such a foil, in particular such a so-called inner liner used in the tobacco industry, is satinized and an array of identification marks is embossed online as a pattern and mad with an apparatus suitable for this and compared to a template by means of an image processing method.

The method which is thus defined is used successfully for the authentication of packaging foils which generally have a thickness of 30 μm to 70 μm and are used e.g., as so-called inner liners, i.e., as packaging foils which are enclosed around a number of cigarettes and these enclosed cigarettes are arranged in a cigarette packet made of cardboard. In this method, the identification marks, generally punctiform elements, are transferred according to a particular template onto the embossing rollers and the foils which are embossed therewith are decoded by means of the same template. Optical reading methods and suitable encoding algorithms are used here.

In the period between the first application of the EP 1 867 470 B1 mentioned in the introduction and the present application, important changes have been carried out or respectively prescribed both with regard to the arrangement of identification marks, i.e., of coding on the one hand and with regard to packaging materials on the other hand. With regard to the identification marks for the authentication of objects, in recent times barcodes in the simple, one-dimensional form as in the case of foodstuffs in supermarkets and resulting therefrom so-called QR codes i.e., "Quick Response" codes have become established, which in particular can also be read and evaluated by a smartphone. Hereinbelow, the term "barcode" is used for all types of such codes, e.g., for simple barcodes, for QR codes and for matrix codes, or further similar codes.

For example, a so-called QR codes generator can be downloaded from the internet, see FIG. 4, with an application method for the use of such codes. There is an increasingly greater number of such barcodes, in particular so-called QR codes and data matrix codes, which are used particularly for advertising and information. The barcodes known hitherto are presented and printed as black-and-white images.

The word QR means that the content of the code can be decoded very quickly after it has been scanned in through a barcode reader or a smartphone or other mobile telephone or else through a webcam. Appropriate apps can be downloaded for the smartphone for the decoding of the codes. As this code is two-dimensional, such a QR code can store very much greater amounts of data and therefore various functions such as spot advertisements, viewing video films, sending SMS or payments can be implemented. This code was publicized by a Japanese firm in 1999 and is subject to an ISO Standard 18004.

A continuous change has also taken place with regard to the packaging material for smokers' products such as cigarettes and cigars. For some time already, packaging foils for the tobacco or food industry have been embossed with embossing roller devices, this concerning in the case of smokers' products the above-mentioned inner liners, which can also serve as packaging material for chocolate, butter or similar foods or electronic components. Parallel to the developments of embossing roller technology, or respectively the production of embossing rollers, a change also took place in the packaging materials, wherein the originally entirely metallic aluminum foils were replaced by paper foils, the surfaces of which, due to environmental considerations, are coated with increasingly thinner metal layers and finally the very thin metal layer was sputtered on. In more recent times and also in the future, the metallization of the inner liners will become even less or these will disappear entirely.

Recently, in addition, efforts are underway to greatly reduce or even eliminate entirely the advertising of smokers' products, so that an embossing of the inner liners with designs which are effective as advertising will no longer be possible to the extent hitherto. Therefore, ways are being increasingly sought to produce new decorative effects without the use of conspicuous embossing, gold edges or suchlike decorations.

New ways are also being sought for product identification, which up until now has been ensured primarily in brand names which are maintained worldwide. Today, in addition, e.g., so-called tactile effects are coming into use, which are produced by special surface structures of the foils or by special engravings.

Currently, in most cases, the cigarettes are enclosed by an inner liner and arranged in a folded box. In most cases, the keeping moist and the protection from external influences are assisted by a covering of a plastic film, e.g., a polypropylene film. The inner liner alone cannot guarantee the desired functions, e.g., keeping the smokers' products moist and protecting from external odor influences on the one hand and certain rigidity for the mechanical protection of the cigarettes on the other hand, and the folded box alone can also not do this. Currently, a suitable folded box carton fulfils these requirements. This suitable folded box carton is named here below as a "blank".

In the present application, therefore, reference is also made in particular to such blanks, which can generally have a weight of approximately 100-400 g/m$^2$ and e.g., a thickness of approximately 300 μm. Here, these blanks are frequently white or, for example, colored grey and they can be plain, lacquered, printed and/or laminated with an aluminum or plastic foil. If a single covering is concerned, it is absolutely necessary that this covering is not damaged during the embossing and subsequent folding, because otherwise the protective function from foreign odors and dehumidification can no longer be guaranteed.

It is pointed out expressly that the embossing of blanks according to the invention which is described below only represents an example and the invention also applies to other packaging foils such as inner liners, which can also serve as foils for the food industry with a weight in a range of 15-400 g/m$^2$, a thickness of 15 to 400 μm and which can be made of metallized paper, aluminum paper, printed paper, paper or aluminum, and to other hybrid and layered foils and metal- or plastic-coated foils.

In particular in the field of tobacco products, there are great efforts to counterfeit these, not least in order to bypass the high customs duties and taxes. This means that not only the tobacco industry itself, which of course suffers from this, but also the customs and tax authorities, are interested in establishing whether the cigarette packets arriving onto the market are authentic.

In principle, the use of the above-mentioned two-dimensional barcodes could meet most requirements, but, as has also been mentioned further above, hitherto only printing methods exist in order to apply such codes. The printing of packaging foils, in particular blanks or inner liners for the covering of cigarettes, online in a cigarette packaging plant is, however, in several respects not able to be carried out or only able to be carried out with great difficulty, in order to apply these codes in online production in the requisite quality at the required speed rotatively.

Proceeding from the prior art explained further above, it is an object of the present invention to indicate a method and device for embossing codes and embossing patterns into packaging material, for example but not limited to packaging foil, the codes able to encode identification information, the authentication of identification information applied on a packaging foil by such codes having a reduced visibility to a human eye, in which on the one hand the packaging foil which is to be embossed can be a foil with a weight of 15-400 g/m$^2$, in particular also a so-called blank with a weight of 100-400 g/m$^2$, with the goal to make the embossed codes difficultly detectable and readable by a human reader or by the human eye. Moreover, according to one aspect of the present invention, a method and device for reading such embossed codes from the packaging material is presented. According to another aspect of the present invention, the embossing of such codes together with the decorative embossing is done by using embossing teeth having a partial polyhedral structure, with inverse congruent structures for male and female embossing sides of the embossing device.

SUMMARY

According to one aspect of the present invention, an embossing tool for embossing a combined embossing pattern into a packaging material is provided. The combined embossing pattern includes decoratively embossed structures and at least one embossed code. Moreover, preferably, the embossing tool includes a pater and a mater embossing device for cooperating with each other, embossing structures of the male and female embossing device formed to produce the combined embossing pattern into the packaging material in an embossing gap.

In addition, preferably the embossing structures of the male and the female embossing device include first embossing structures intended for making the at least one embossed code, which are inverse congruent male and female embossing structures having a polyhedral shape, and the embossing gap has a substantially constant width, the substantially constant width corresponding to a thickness of the packaging material before embossing plus a thickness margin that takes into account at least one of a surface structure of the packaging material, internal structuration of the packaging material, and a machining tolerance of the embossing structures.

Furthermore, preferably the decoratively embossed structures and the at least one embossed code produced by the embossing structures are arranged such that the at least one embossed code has a reduced detectability and visibility as compared to the decoratively embossed structures.

According to another aspect of the present invention, a method for embossing a combined embossing pattern into a packaging material by an embossing device is provided. The combined embossing pattern includes decoratively embossed structures and at least one embossed code. Moreover, preferably, the embossing device includes a male and a female embossing device for cooperating with each other configured to produce the combined embossing pattern into the packaging material in an embossing gap. In addition, preferably, the embossing structures of the male and the female embossing device comprise first embossing structures intended for making the at least one embossed code, which are inverse congruent male and female embossing structures having a polyhedral shape, and the embossing gap has a substantially constant width, the substantially constant width corresponding to a thickness of the packaging material before embossing plus a thickness margin that takes into account at least one of a surface structure of the packaging material, internal structuration of the packaging material, and a machining tolerance of the embossing structures.

Moreover, the method preferably includes the step of embossing the packaging material with the combined embossed pattern including the decoratively embossed structures and the at least one embossed code, arranged such that the at least one embossed code has a reduced detectability and visibility as compared to the decoratively embossed structures.

According to yet another aspect of the present invention, a method for reading an embossed code that is embossed in a packaging foil is provided, the embossed code representing code information. Preferably, the method includes the steps of illuminating an area of the embossed code by a first light source, the first light source having a first illumination direction arranged to create a first shadow pattern on the packaging foil, and capturing a first image from the first shadow pattern, illuminating the area of the embossed code by a second light source, the second light source having a second illumination direction different from the first illumination direction, arranged to create a second shadow pattern on the packaging foil, and capturing a second image from the second shadow pattern. calculating a representation of the embossed code based on the first and second images, and reading the code information from the representation of the embossed code.

(1) The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF THE SEVERAL VIEWS OF THE DRAWINGS

The invention is explained in further detail below with the aid of drawings of example embodiments.

FIG. 22A to 22E shows the steps of a method and a device for reading and decoding a code pattern that has a low visibility:

Herein, identical reference numerals are used, where possible, to designate identical elements that are common to the figures. Also, the representations are simplified for illustration purposes and may not be depicted to scale.

DESCRIPTION OF THE SEVERAL EMBODIMENTS

Packaging foils for the tobacco industry or for the food industry have already been embossed by embossing-roller devices for some time, wherein this can concern e.g., so-called inner liners, which are wrapped around a number of cigarettes, or packaging material for chocolate, butter or similar foods, or electronic components. In almost all cases, the concern here is with thin foils of approximately 70 μm thickness.

The so-called inner liners firstly consisted of pure aluminum foils, such as for example household foils, and these were embossed in that they were guided through between two rollers, at least one roller of which had a relief, the so-called logos. Up until approximately 1980, such a pair of rollers consisted for the majority of a steel roller, on which the relief was formed and of a counter-roller of a resilient material, for example rubber, paper or plexiglass. By the impressing of the relief of the male roller into the counter-roller=female roller, the mirror-inverted impression was produced. At least since 1980, embossing rollers with small teeth have become accepted for the embossing and satinizing of packaging foils, preferably in a pin-up/pin-up constellation, see EP 1 867 470 B1 mentioned in the introduction.

The legislation concerning smokers' products, which is having an increasingly restrictive effect, and the efforts concerning further features such as tactile, acoustic or other optical features on the one hand and the ever greater variety of different types of packaging materials such as aluminum foils, metal-coated papers, tipping papers, hybrid foils, plastic foils, cardboard or cardstock on the other hand lead to the conventional pin up-pin up embossing rollers, in which both the driven roller and also the counter-rollers have a large number of teeth, namely still being able to be used fully and successfully for the embossing of inner liners, but coming up against their limit for the aims indicated above.

Figure 1:
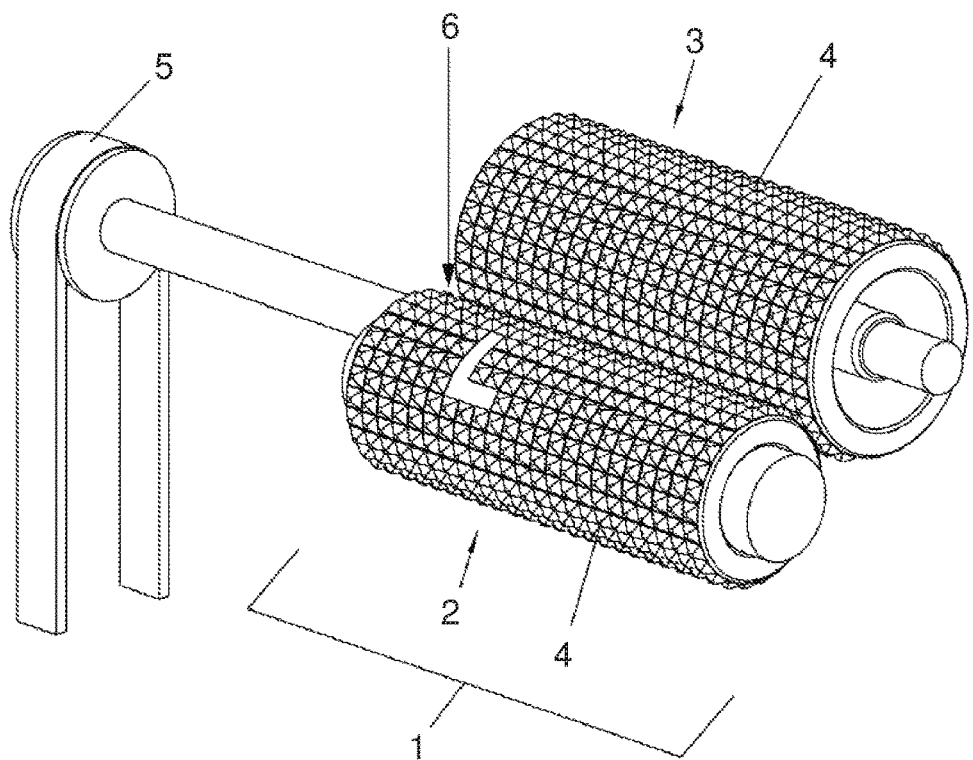
FIG. 1 shows an embossing device 1 having a roller arrangement according to the background art for the sanitizing and embossing of identification marks.

Examples of such embossing devices are described in EP 1 867 470 B1 mentioned in the introduction. FIG. 1 shows therefrom a simple form of an embossing device 1 with two embossing rollers 2 and 3 with teeth 4 in the pin-up-pin-up configuration, wherein the embossing roller 2 is driven by a drive 5 and is provided with a logo, e.g., an "L", the embossing rollers 2, 3 forming a nipping or embossing gap 6. At this point the corresponding teeth were removed on a roller to form the logo. In this patent document it is described in addition that the counter roller(s) can also be smooth with elevations, or provided with longitudinal ribs or with rings. The foil is indicated to be embossed through embossing gap 6.

One aspect of the present invention is to produce by the devices known per se with modified individual teeth, rings or longitudinal ribs on embossing rollers or by the arranging of suitable structures on a roller which is smooth per se, a particular arrangement of identification marks, e.g., small embossed or debossed indentations into solid or sheet material, which presents an array of points, marks or suchlike, which can be recognized and therefore identified in the authentication process. For this, with individually modified teeth, rings, longitudinal ribs or suitable structures on a roller which is smooth per se, which are modified according to a quite specific pattern, for example a chessboard-like pattern or another repeatable pattern are produced, wherein in this array of points bringing about the satinizing with respect to the normal, one or more specific geometric zones are singled out, in which the array of identification marks are authenticated.

Figure 2:
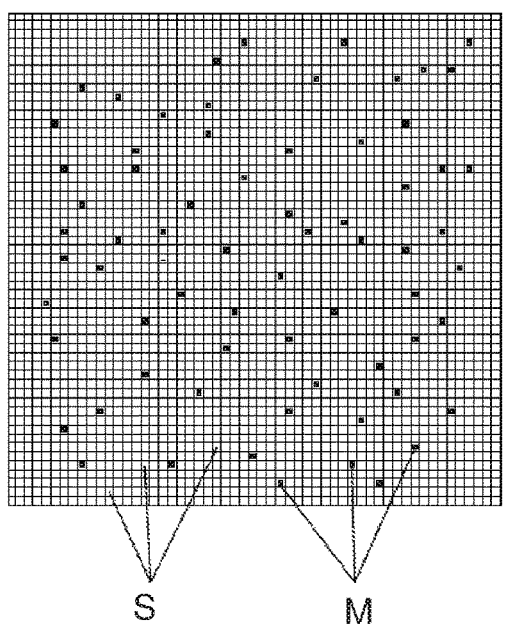
FIG. 2 shows diagrammatically a possible arrangement of identification marks according to the background art.
Figure 3:
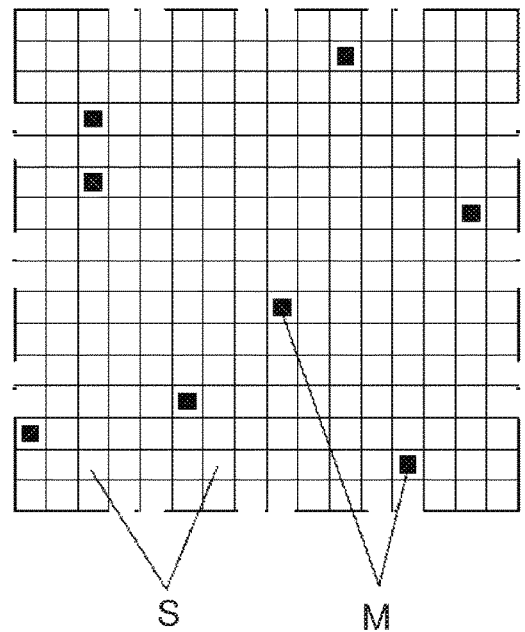
FIG. 3 shows, greatly enlarged, a cutout of the arrangement of FIG. 2.

In FIG. 2 a grid on a foil is drawn diagrammatically, as is produced on satinizing, i.e., regularly arranged indentations S, which were brought about by the described methods and devices for satinizing. In addition to this are the identification marks M, differently configured indentations, which were brought about by the impressing of microstructures. FIG. 3 shows a cutout enlargement of FIG. 2. The pattern of the identification marks was transferred onto the embossing rollers according to a template.

In a possible example embodiment of this method, the surface of a packaging foil provided with identification marks is captured by a camera, wherein this term "camera" comprises all types of camera, including for example CCD cameras, CMOS cameras and suchlike. However, the method also permits other image capture methods. In order to carry out a comparison between the template with a particular pattern, e.g., chessboard-like template, and the image captured by the camera, the image processing, based on so-called template matching, is used.

The foil as transmission medium can have defects relating to manufacture and use. In order to nevertheless enable a reliable extraction of the concealed identification marks, these are provided with redundancy, i.e., an additional coding is carried out, adapted to the transmission channel. This redundant coding then permits a reliable extraction of the identification marks during the reading process, which leads to a higher reliability of authentication. Here, the identification marks are extracted by means of a decoding method and are compared with the original information on the template.

The statistical correlation, established through this method, between the marks of the template and those of the embossed identification mark is used as a measure for the similarity between template and embossed pattern and therefore forms the basis for the decision as to authenticity. In practice, it has been found that through the empirical establishing of a minimum level of the processing signal with respect to noise, an authentication can be achieved which is sufficiently reliable for many purposes.

Figure 4:
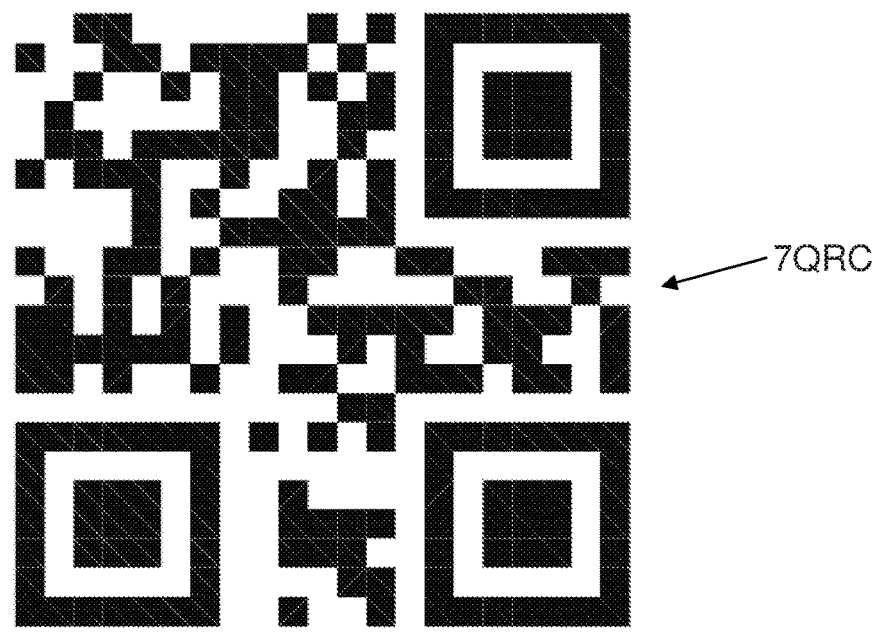
FIG. 4 shows a barcode in the form of a QR code from the internet.

As mentioned in the introduction, work is being carried out increasingly in recent times with barcodes for identification and authentication, wherein for more sophisticated texts and other applications in particular the so-called QR codes and data-matrix codes come into consideration, which in contrast to the simple 1D barcodes for supermarkets and suchlike have two-dimensional structures and therefore have a very much greater information-holding capacity. FIG. 4 is an example of an output of a QR code generator, which can be downloaded from the internet. Owing to their large capacity, such barcodes as QR codes and matrix codes labelled here as 7QRC are able to receive authentication marks which are difficult to discover and decoded. This includes the fact that such barcodes, in order to be difficult to discover, have to be as small as possible.

Until now, it is only known that such codes are printed in black-and-white onto a substrate, and because such a printing method is not suitable for the packaging plants of smokers' products, which operate at high speed, it is one of the aspects of the invention to emboss such barcodes onto a packaging foil, which can be a blank. It can be seen from the structure of such a code that such a code can no longer be embossed by embossing rollers with teeth, because as fine a structure and extent as possible is to be aimed for.

Apart from the embossing rollers with teeth, rollers are also known which operate according to the male-female system. Known roller systems with a male roller with male structures and a female roller with female structures inverse-congruent thereto can indeed extend the range of decorative elements, but due to the manufacturing and sorting in pairs are very cost-intensive and in particular time-consuming to produce, so that their production for an industrial embossing for the tobacco industry is little used until now.

Furthermore, a fine embossing can only be guaranteed with a very great expenditure in the production of such rollers. In addition to this is the fact that in this case, with the use of a male roller and an inverse-congruent female roller, the foil lying there between is squeezed during embossing such that tensions occur in the transverse direction, which are unacceptable for tobacco product papers. Furthermore, a boundary to the hole formation occurs which is very difficult to control and very high pressures are necessary for a high speed online process, wherein the embossing times lie in the millisecond range. Finally, there is a tendency to use thicker papers up to 300 µm and more.

In patent application PCT/EP2013/056144 of the same applicant, this reference herewith incorporated by reference in its entirety, solve the general problem of indicating a method for the manufacturing of a set of embossing rollers, by which it is possible to carry out fine embossing for the most varied of described surface structures of the indicated materials of the most varied type in online operation of a packaging plant, it is proposed that in a male-female embossing roller system the female surface structure is produced independently of a previously produced or physically already existing male surface structure. In the not previously published EP application No. 13 181 978.1 the above method is expanded, in order to also be able to emboss the smallest structures with an even greater precision.

Figure 5:
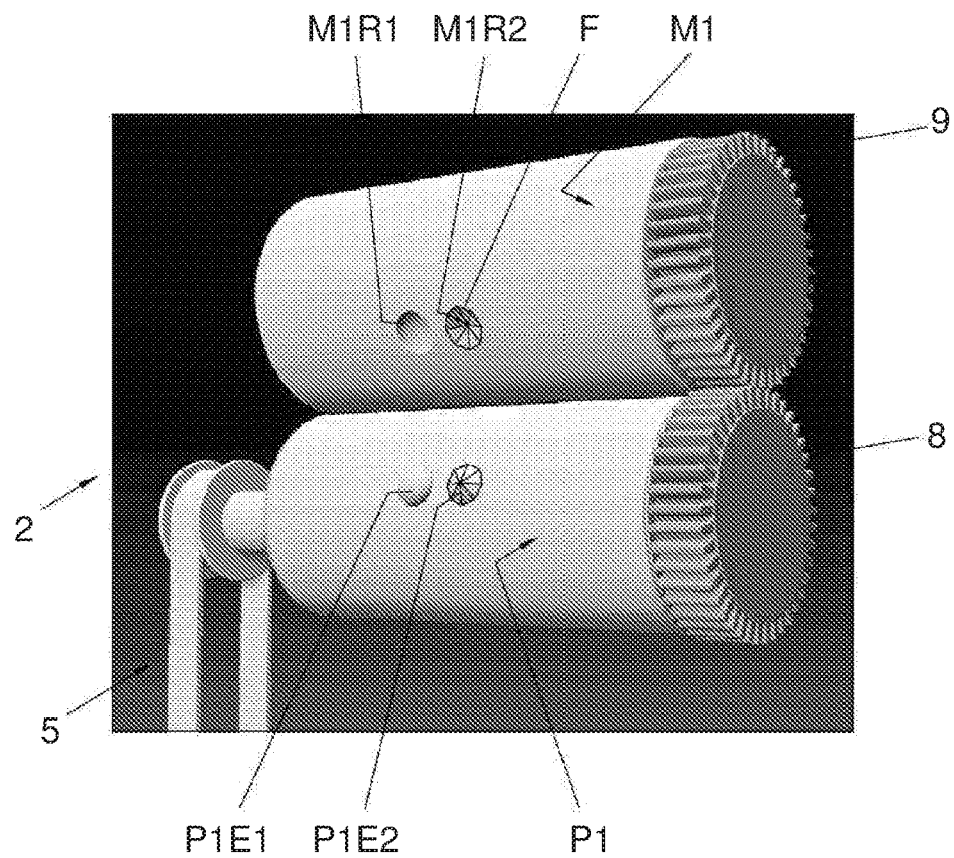
FIG. 5 shows a male-female embossing roller arrangement according to an aspect of the invention.

FIG. 5 shows from the above-mentioned application to explain the principle diagrammatically and in a simplified manner a structure of an embossing device 1 with a male roller P1 and a female roller M as collaborating roller pair 2, wherein the male roller is driven by a drive 5. The male roller P1 has two elevations P1E1 and P1E2 which are different from one another, and the female roller M1 has depressions M1R1 and M1R2 associated with the elevations of the male roller. The two rollers are connected with one another via a fine gear 8 and 9.

As the structures of the female rollers are produced independently of the structures of the male rollers, the female depressions are not precisely inverse-congruent to the associated male elevations. As is further stated, the deviations can comprise both height or depth dimensions and also angles. The elevation P1E1 and the associated depression M1R1 are hemispherical and the elevation P1E2 and the associated depression M1R2 are structured.

Figure 6:
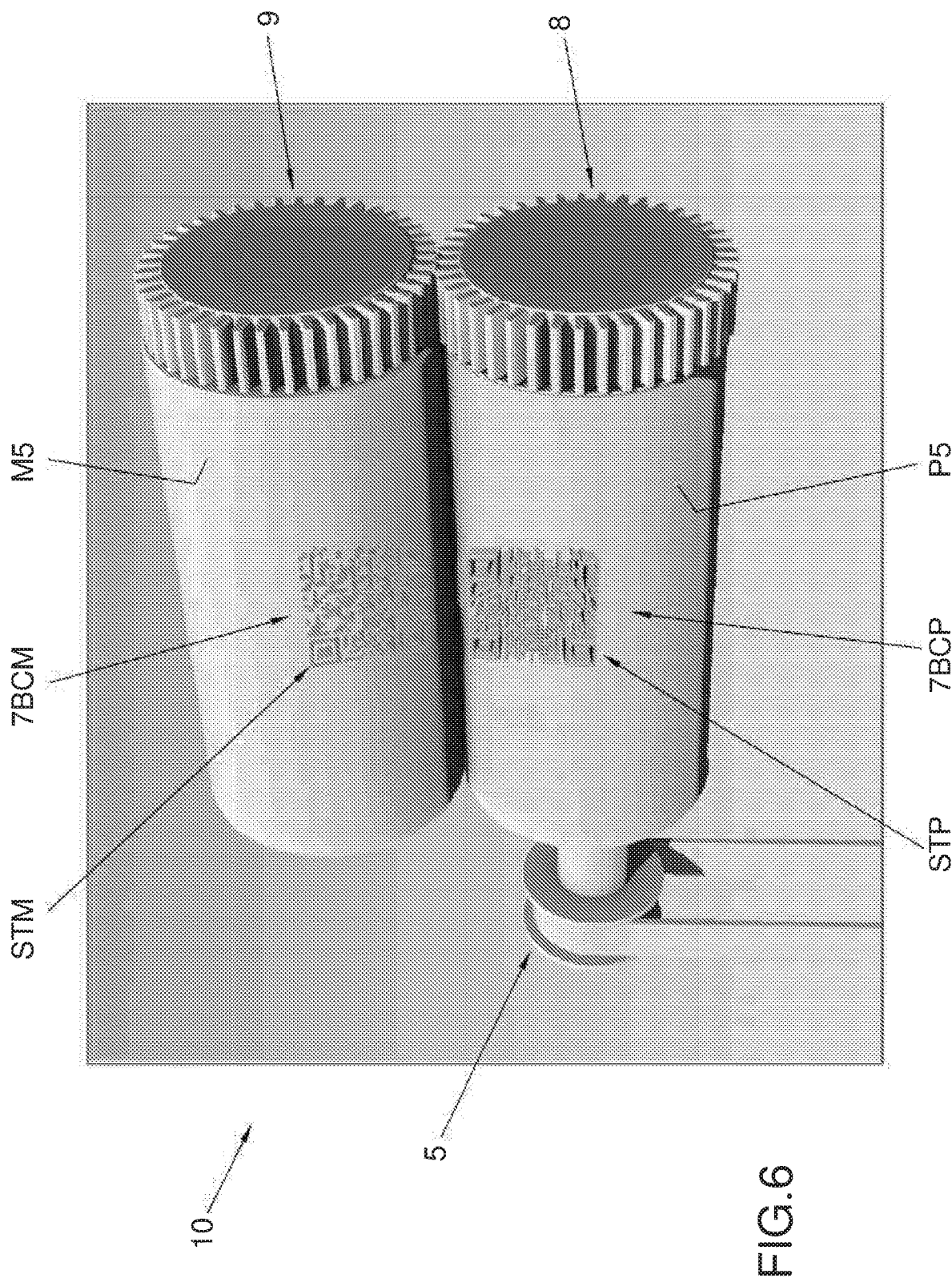
FIG. 6 shows a set of embossing rollers M5, P5 with a male roller and female roller, on the surface of which a greatly enlarged barcode serving as identification mark is arranged.

FIG. 6 shows an embossing device 10 according to one aspect of the invention, which has a male roller P5 and a female roller M5. The two rollers have a structure P5E5 and M5R5, associated respectively with one another, in the form of a barcode 7BCP and 7BCM. The individual structural elements are designated by STP or respectively STM. The representation of the barcode of the data-matrix type is greatly enlarged here. In order to make the finding of such a code difficult, in this example the dimension is reduced to 4×4 mm.

Figure 7:
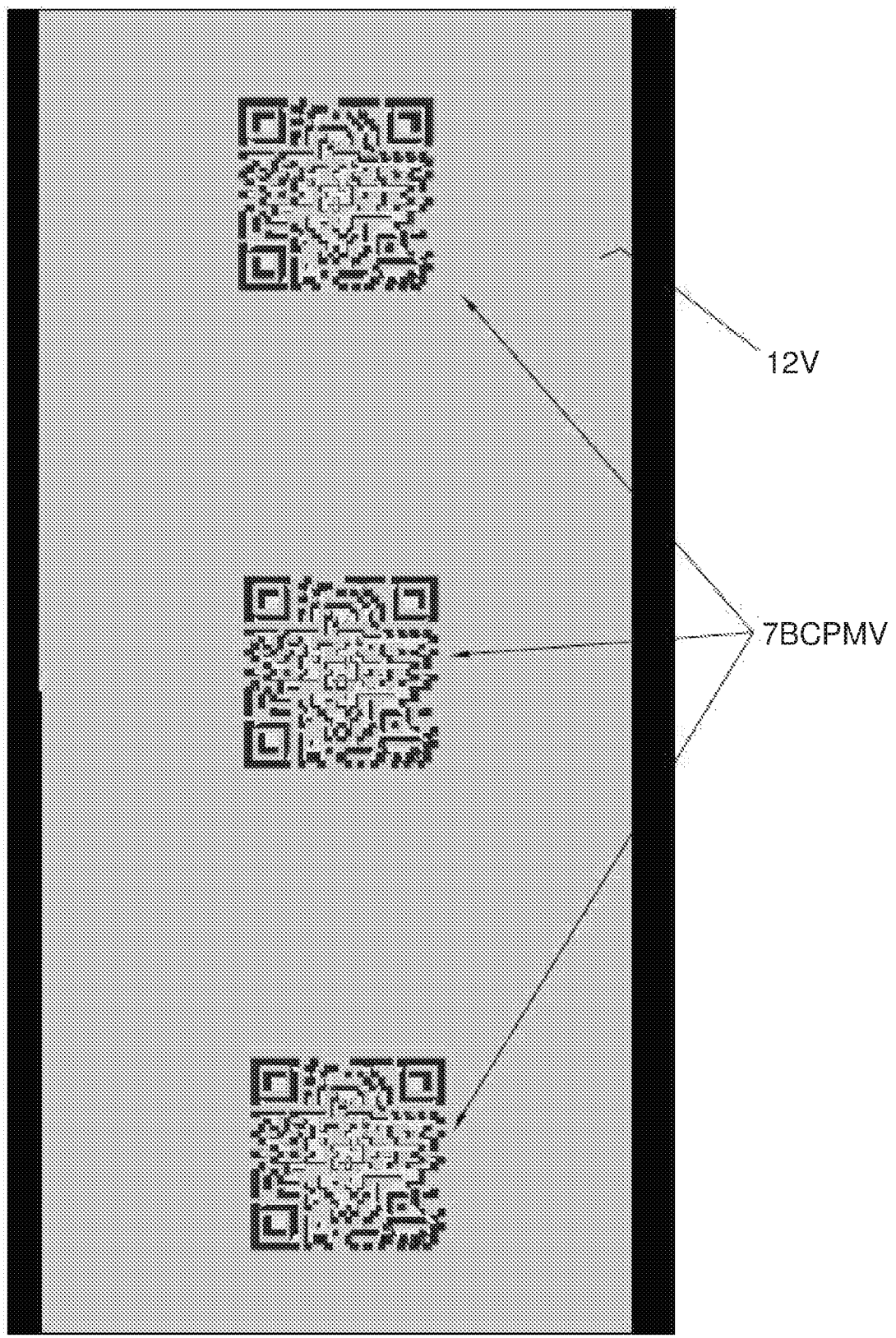
FIG. 7 shows a surface of a blank 12V embossed with the set of embossing rollers according to FIG. 6.

FIG. 7 shows a packaging foil 12V, resulting from a blank, for the packaging of cigarettes, before the folding, separating and bending, on which the code 7BCPMV is arranged, which has been produced by the two embossing rollers P5 and M5. Here, the barcode is also illustrated with a great enlargement.

Figure 8:
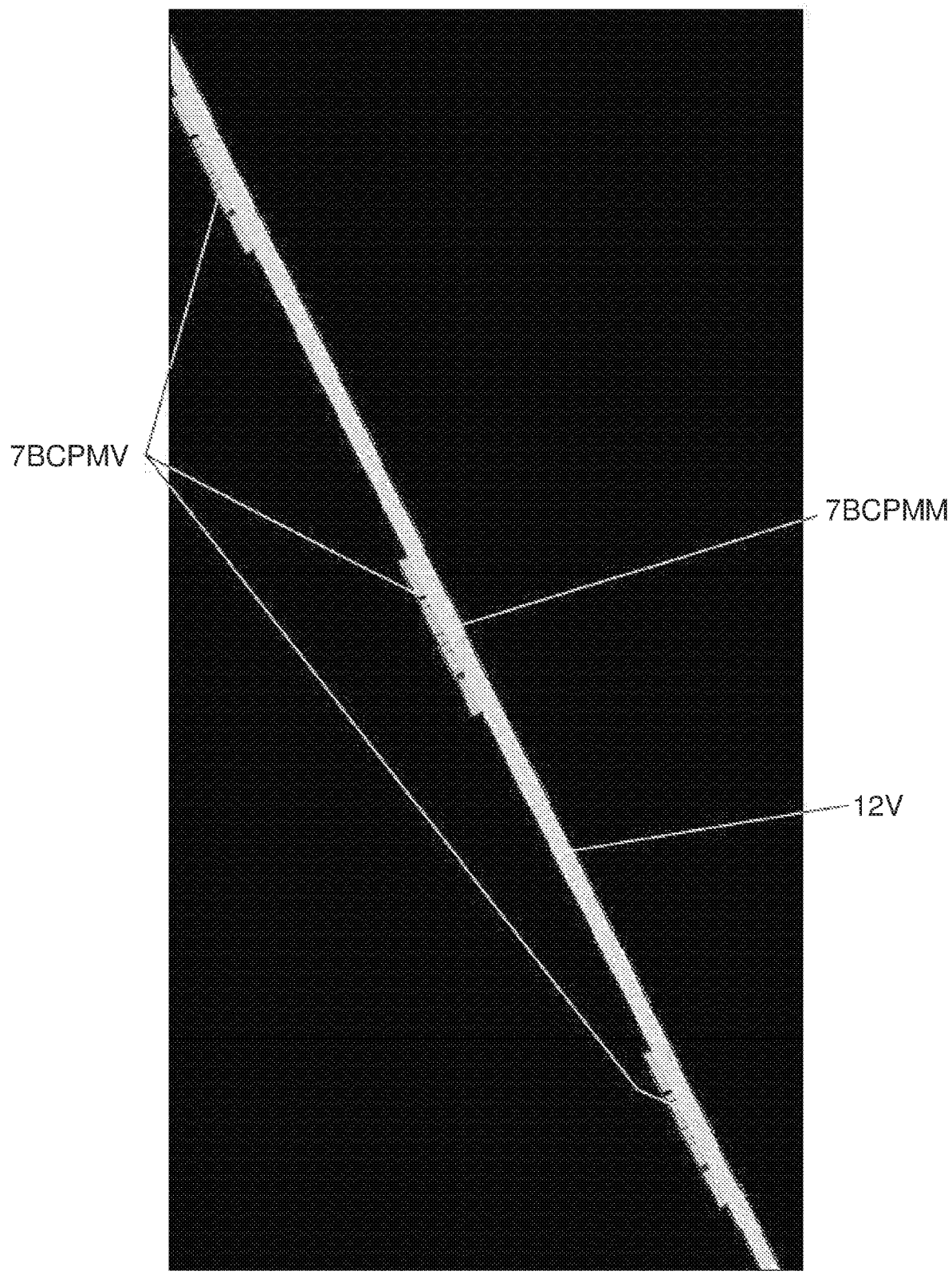
FIG. 8 shows a cross-sectional view of the blank 12V of FIG. 7.
Figure 12:
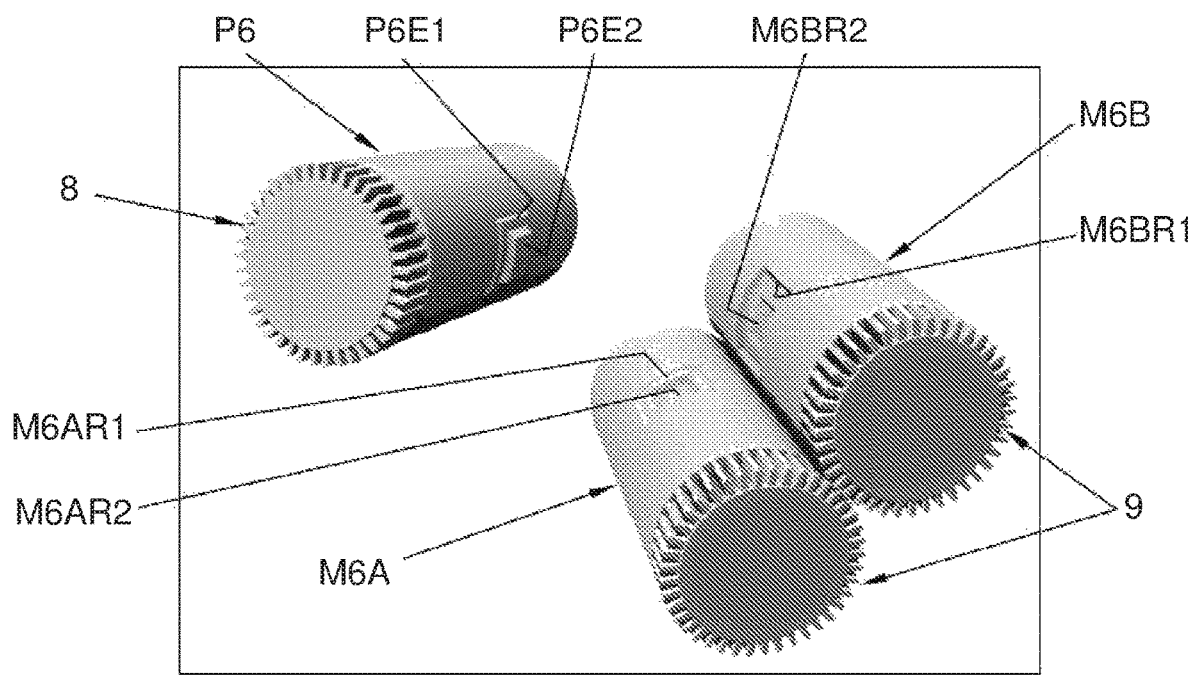
FIG. 12 shows an embossing device with three embossing rollers P6, M6A, M6B.

FIG. 8 shows the same foil 12V in a section, wherein the thickness is approximately 300 μm. In this figure, the front side is arranged on the left and the rear side according to FIG. 12 is accordingly arranged on the right. Codes 7BCPMV are shown on the left side of foil 12V, with code 7BCPMM shown on the right side.

Figure 9:
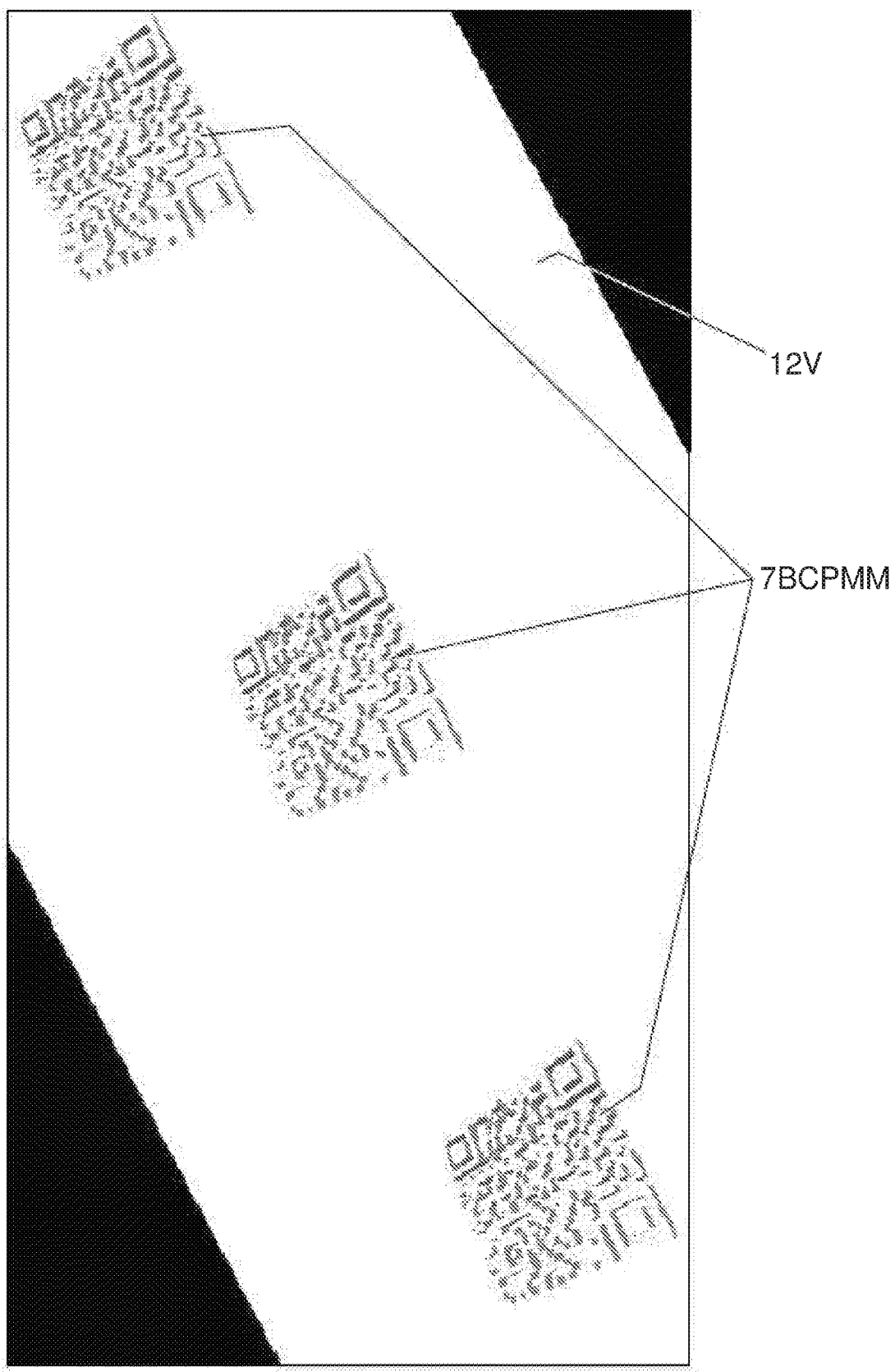
FIG. 9 shows the rear side of the blank 12V of FIG. 7.

FIG. 9 shows the same foil 12V in a section, showing codes 7BCPMM on one side of the foil 12V.

Figure 10:
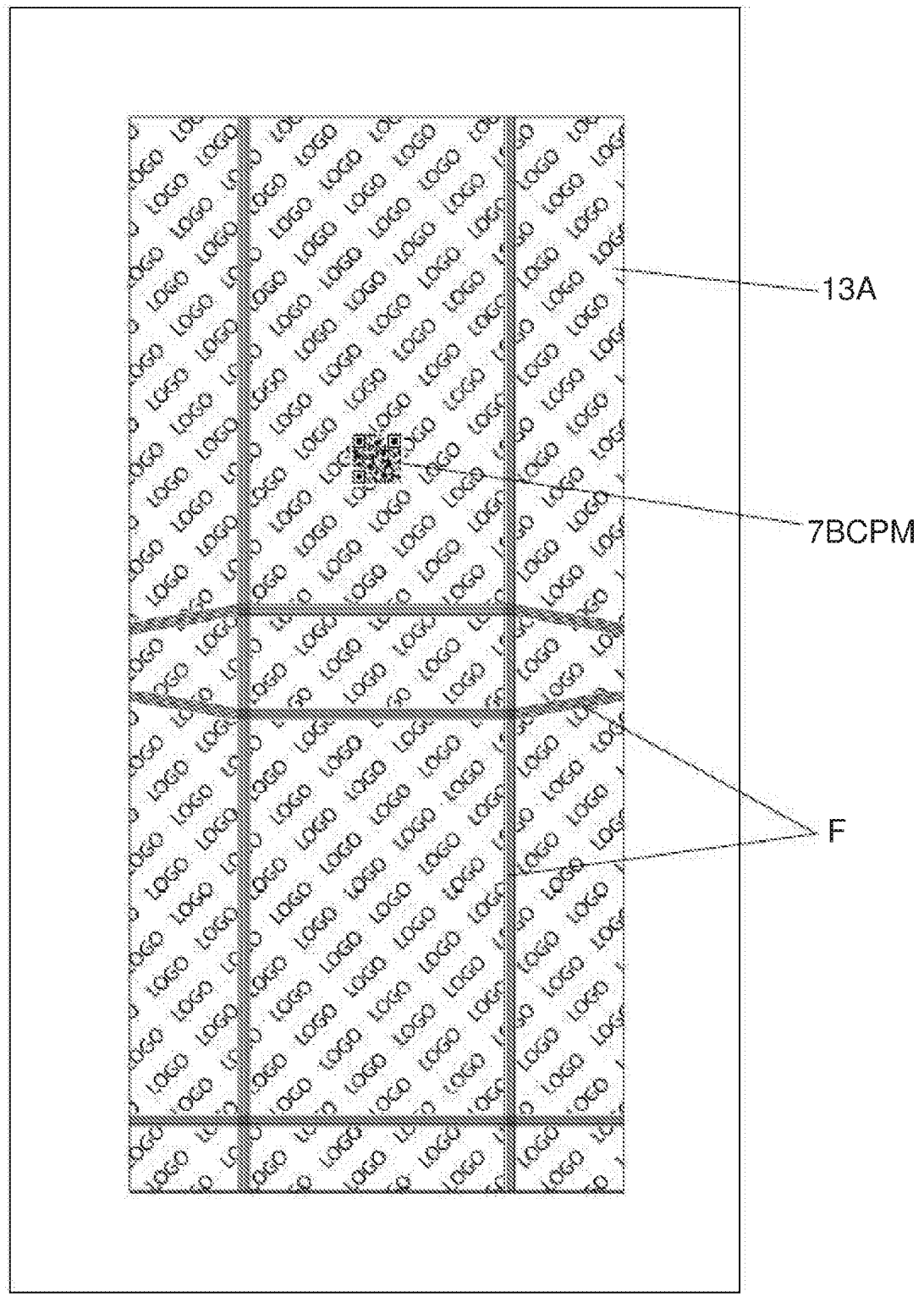
FIG. 10 shows an inner liner 13A for the packaging of cigarettes, provided with logos.

FIG. 10 shows an inner liner 13A for use in a cigarette packaging plant, wherein in addition to the barcode 7BCPM and the logos, fold lines F are embossed by the embossing rollers. In addition, it can be seen from FIG. 10 that the packaging foil 13A can contain further logos, logo being understood to mean any marks, images, texts and suchlike which were e.g., already printed on the inner liner 13A or are also embossed according to the mentioned, not previously published EP application No. 13 181 978.1, this reference herewith incorporated by references in its entirety. Here, the rollers can be provided with logos according to FIG. 6. The barcodes can contain only information regarding authentication, or a logo, or both.

Figure 11:
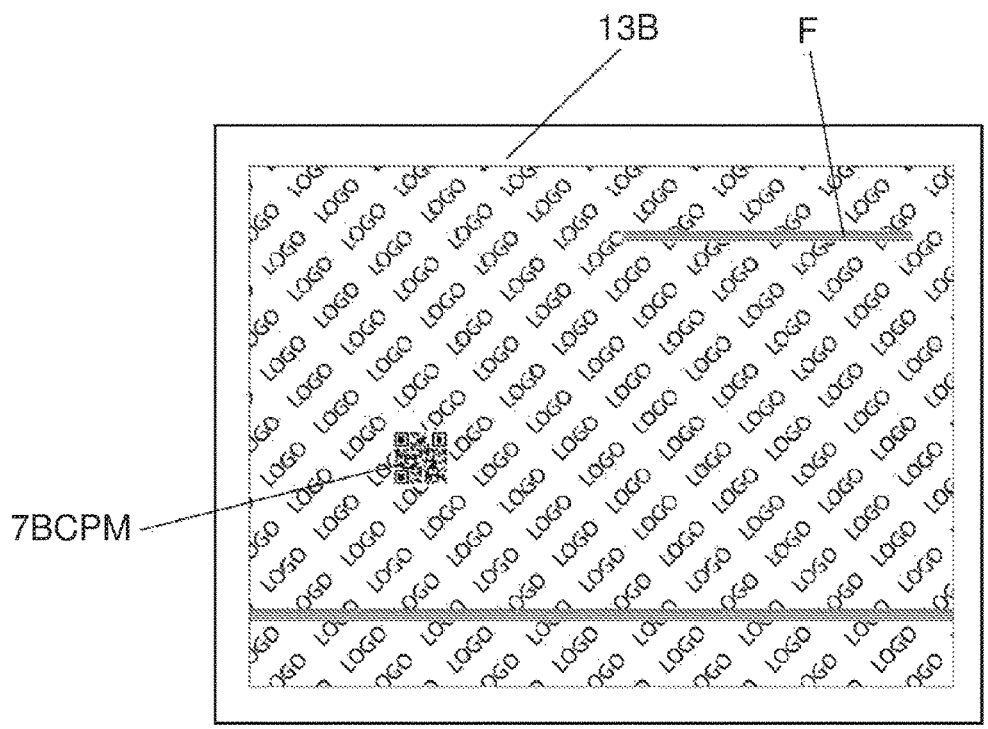
FIG. 11 shows a further inner liner 13B for the packaging of cigarettes in horizontal direction, likewise provided with logos.

FIG. 11 shows a further inner liner 13B for another cigarette packaging plant, likewise provided with logos 7BCPM and fold lines F.

In FIG. 12 it is illustrated diagrammatically that not only embossing devices with two embossing rollers, but for a range of applications expediently embossing devices with a set of embossing rollers with three embossing rollers 8, 9 can be advantageous. Here, two female rollers 9, M6A, M6B can be associated with one male roller 8, P6 or two male rollers can be associated with one female roller. Theoretically, it is also conceivable to use a set of embossing rollers with more than three embossing rollers.

In FIG. 12 the structures are illustrated in simplified form for the sake of clarity, and the male roller P6 has two rectangles P8E1 and P8E2 arranged over one another, and the female rollers M6A and M6B have associated depressions M6AR1 and M6AR2, M6BR1 and M6BR2, wherein the depressions M6AR1 and M6AR2 have a smaller depth than the depressions M6BR1 and M6BR2. As indicated in FIG. 12, the three rollers work together in a three-roller system, wherein the elevations P6E1, P6EE2 are arranged on the male roller such that respectively a pair of elevations work together with the associated depressions on the first female roller and the second pair of elevations work together with the associated depressions of the second female roller, wherein the depressions M6AR1, M6AR2 are less deep than the depressions M6BR1, M6BR2.

It is also possible that respectively the male part in a two-roller system firstly works together with the one female roller and then in a second roller system works together with the other female roller, wherein respectively the male roller P6 firstly works together with the female roller M6A and then the same male roller P6 works together with the other female roller M6B. This permits an embossing of raised or deep figures, without stressing the foil excessively. Here, in particular, a tearing of the foil at the sites of the lower female part depressions can be prevented. It is also possible to use embossing devices arranged in series, with two or more embossing rollers, in order to achieve a gentler embossing.

Thus, for example, a second code can be overlaid on a barcode with a logo, which can be read by a smartphone or suchlike and decoded, which second code can only be decoded by means of the encoding code with the algorithm appropriate for this. Thereby, reading by means of a smartphone is made difficult and therefore a very high degree of security can be guaranteed.

It is evident that a reduction of the dimensions of the pixel size brings a substantial increase to the amount of data available for a given surface, but limits are set on the embossing rollers with regard to the production of such codes by means of mechanical apparatus such as millers. It is possible to emboss and read QR-like codes with a dimension of 8×8 mm and data-matrix-like codes with a dimension of 4×4 mm. With a further desired reduction of these dimensions and therefore also those of their structural elements, it is necessary to use a laser engraving system for the production thereof on the embossing rollers, as is indicated e.g., in the named EP 2 513 687 A1. In connection with the method according to one aspect of the invention, it is important that the barcode which is to be used is transferred onto the embossing rollers such that the embossed packaging foil can be read correctly.

The standard barcode readers are set to black-and-white codes, so that smartphones or webcams and suchlike can read these. In the case of packaging foils, e.g., of grey or white cardstock, the reading or respectively scanning of the embossed structural features is substantially more difficult, because in this case the surface condition or respectively the different reflection of the light by the depressions or elevations plays a great part. Furthermore, the paper fibers and the type and extent of contamination play a part in the reflection behavior.

Tests with a smartphone have shown that it is possible to produce, emboss, read in and decode an embossed barcode of the QR-like type with a size of 8×8 mm or of the data-matrix-like type with a size of 4×4 mm. However, in the case of complex codes and difficult reflection conditions and smaller dimensions, it may be necessary to use a scanner on the basis of white light interferometry or other 3D-measuring technology. This is also the case in particular if the barcode is read through the covering foil made of transparent plastic.

With the use of a laser engraving system, as disclosed further above, it is possible in addition to provide regions of the structural elements with microstructures, for example with interference grids, which produce color effects on the embossed medium through interference. Through such a laser engraving system, it is possible in addition to produce any other micro- or nanostructures or other complex structures on structural elements, in order to thereby produce further coding possibilities.

Figure 13:
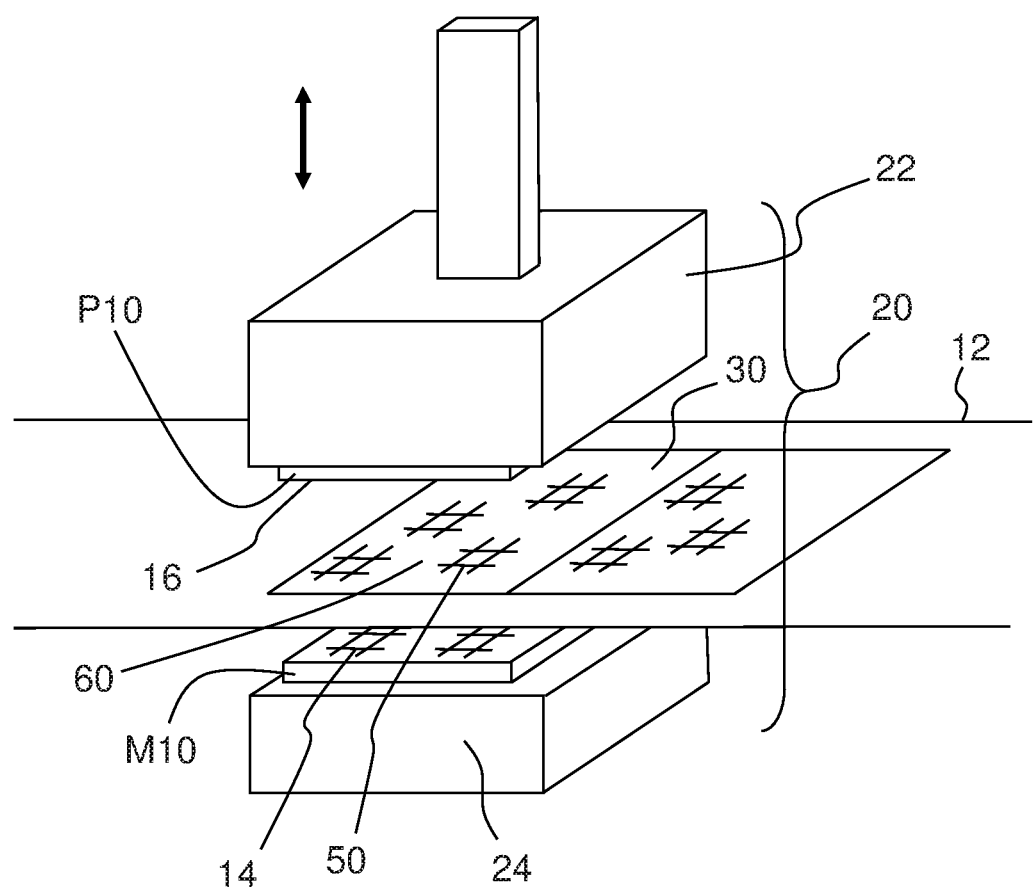
FIG. 13 schematically shows an embossing device using embossing stamps P10, M10 for engraving without the use of rollers.

FIG. 13 shows another schematic representation of an exemplary device for forming combined embossed patterns 30 in packaging material or foil 12, according to one aspect of the present invention, in which the packaging material 12 is stamped for engraving. Embossing device 20 includes a movable embossing stamp 22, with male embossing die P10 having a male embossing structure 16, a static counter stamp 24 with a female embossing die M10 having a corresponding female embossing structure 14, packaging material 12 that is to be embossed, for example a packaging foil, and a combined embossed pattern 30 in material 12 that has been formed by embossing device 20.

For the purpose of this patent specification, the expression "combined embossed pattern 30" is defined as an embossing pattern that has been embossed into packaging material 12 that includes both decorative embossing patterns, for example decorative embossing pattern 60, and one or more codes that have taken the form of an embossed structure in material 12, for example the code patterns 50. Preferably, the combined embossed pattern 30 has been formed by a single embossing process, in which the combined embossing pattern 30 is directly formed by the embossing device 10, 20 forming simultaneously both the decorative and code elements, and preferably not by two different embossing devices. As further explained below, one or more code patterns 50 can be arranged relative to decorative embossing pattern 60 such that they are less visible to the human eye, when the human is inspecting the embossed packaging material 12. Also, it is possible that different code patterns 50 overlap each other in surface area, or that decorative embossing patterns 60 are formed to be formed inside a surface area of one or more code patterns 50, to reduce detectability and visibility of the code patterns 50 vis-à-vis the decorative embossing patterns 60, to form combined embossed pattern 30.

Figure 14A:
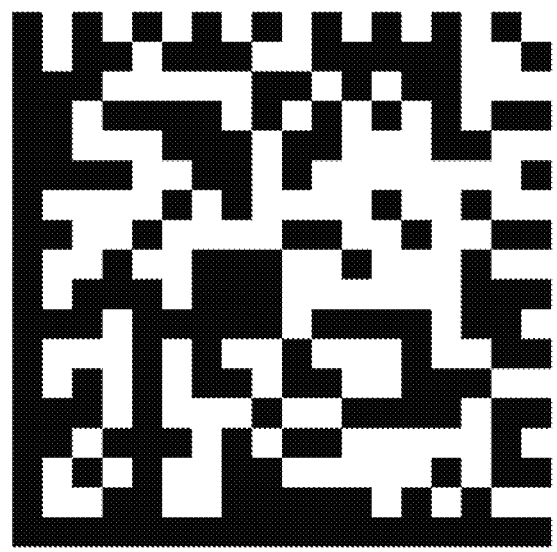
FIG. 14A-14C shows schematic representations of the creation of a combined embossed pattern in packaging material or foil, including a code patterns and decorative embossing pattern.
Figure 14B:
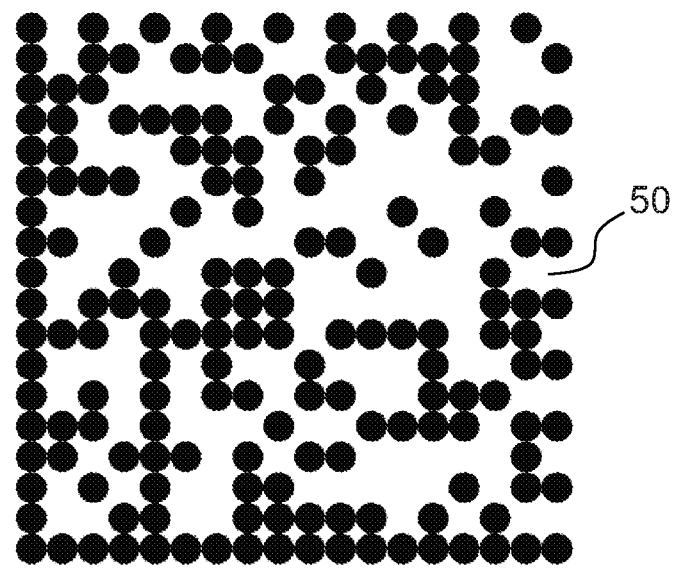
Figure 14C:
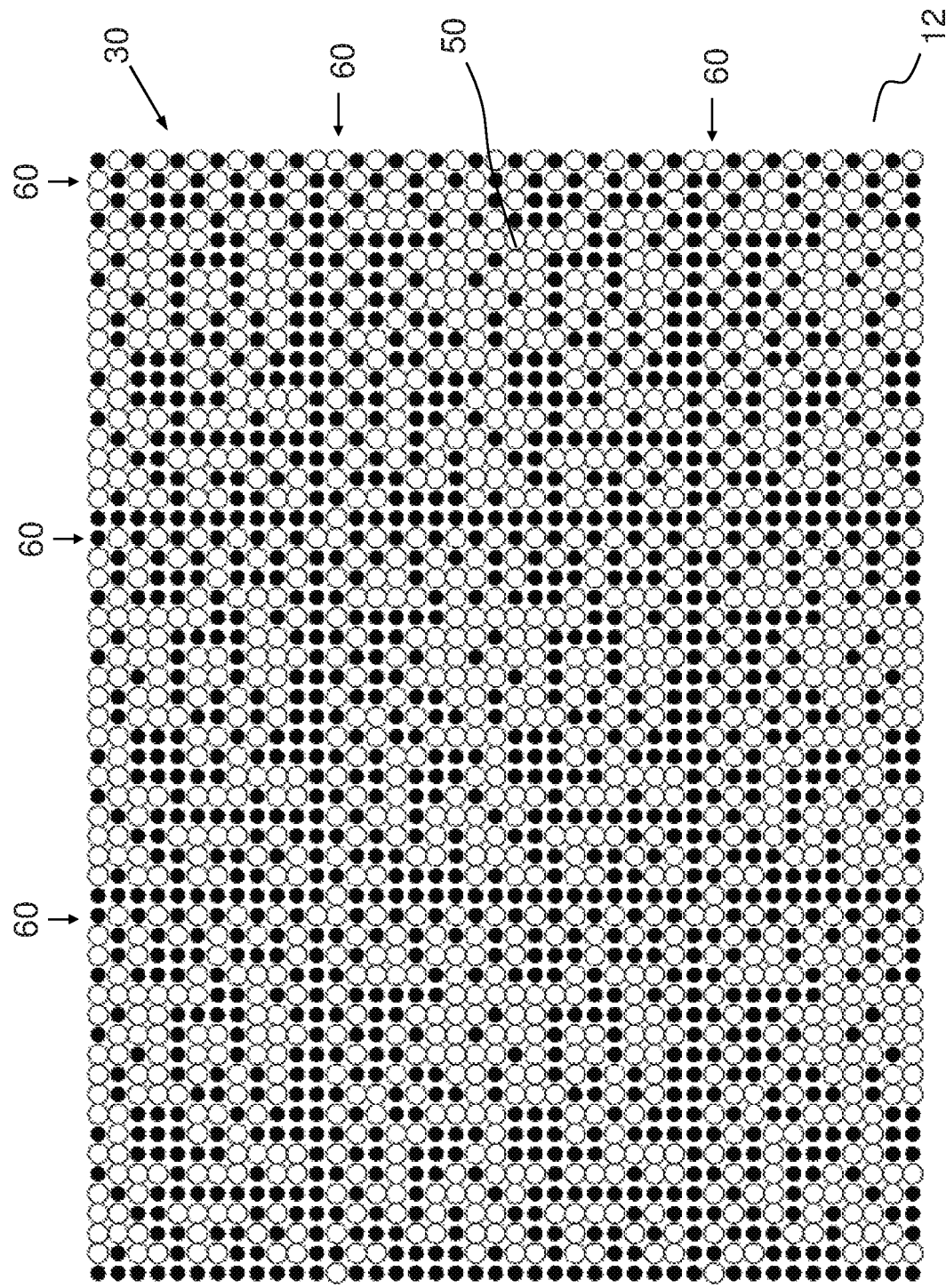

In one embodiment, as shown in FIGS. 14A, 14B and 14C, a combined embossed pattern 30 of packaging material 12 can be created by choosing a pattern that is composed of two-dimensional patterns in the form of a n×n sized data-matrix-like code, as a code pattern 50, and an arrangement of a series of such data matrix codes in an array to form a two-dimensionally repeating structure, and a decorative embossing pattern 60. The combined embossed pattern 30 therefore consists of both code patterns 50 and decorative embossing patterns 60, in the variant shown an array of the same data-matrix-like codes and lines that are arranged in an array with alternating dots around the code patterns 50 that form decorative embossing pattern. In this variant, a depth or height of the embossing for the code pattern 50 and decorative embossing pattern 60 are the same, and by putting code patterns 50 among decorative embossing pattern 60, the code patterns 50 are not directly perceptible or detectable by human eye, and appear to be solely part of the decorative embossing.

For example, FIG. 14A shows an exemplary data-matrix-like code made of eighteen (18) to eighteen (18) square cells, encoding code information. For example, in the variant shown, the code information represents the letters for the website "www.boegli.ch," and this code information is encoded into the data-matrix-like code. Next, as shown in FIG. 17B, an embossing structure is shown that can be part of structural elements STM, STP of embossing device 10 shown in FIG. 9 with male roller 5P and female roller 5M, or the structuring of embossing dies M10, B10 of embossing tool 20 of FIG. 13, representing the data-matrix-like code of FIG. 14A, with an exemplary cell pitch of 0.3 mm. In the variant shown, the embossing structure uses conical, sphere, or cylindrically shaped embossing teeth for embossing, symbolically represented by round projections or pins for the dots of the data-matrix-like code of FIG. 14B. As shown in FIG. 14C, based on this data-matrix-like code, a corresponding embossing structure for an embossing devices 10, 20 can be manufactured, for example but not limited to an embossing roller, and embossing stamp, and imprint mold, injection mold.

The embossing device 10, 20 includes a patterned surface as a male and female embossing structure for creating the combined embossed pattern 30 in packaging material 12, with an array of data-matrix-like codes, with the same pitch of the cells of the data-matrix-like code. This allows creating a patterned or embossed surface on packaging material 12 that has an esthetic or decorative embossing feeling and appearance, and simultaneously has code information embedded therein. In addition, by combining both the code patterns 50 and decorative embossing patterns 60 with an embossing having the same pitch, and arranged adjacent to each other, it is possible to reduce the possibility of detecting and reading the code pattern 50 by a human viewer. FIG. 14C shows a top view of packaging material 12 having the combined embossed pattern 30 structured therein, with three codes arranged in a width or transversal direction. Because of the repetition of the code information with the plurality of data-matrix-like codes, code information has also been made redundant in the packaging. In the variant shown, between two adjacent data-matrix-like codes on the packaging material 12, one or several lines of alternating projections or pins and blanks can be arranged as a separation line or a filler line, along both a transversal and longitudinal direction of the packaging material, the lines in each direction being parallel to each other. These lines serve as a decorative embossing pattern 60 and do not include any information. In the variant shown, the decorative embossing pattern 60 is made of lines being only one dot in width, but could be made of lines using several dots of width. In the example shown in FIG. 14C, combined pattern 30 is made of an array of square elements, with square-shaped matrix codes. However, different arrangements are possible, for example an array of rectangular-shaped elements, triangular-shaped elements, and by using codes that have a different shape than a square shape.

According to one aspect of the present invention, with the features of the method described above, it is possible to provide for an embossed pattern 30 into packaging material 12, where the code patterns 50 are embedded into a décor embossing pattern 60 so that the overall embossing appears to be decorative, and code patterns 50 are not readily viewable by human eye, and only minimally interfere with the esthetic appearance of the embossed product that can be made of embossed packaging material 12. This can be achieved by choosing a specific layout between the code patterns 50 and the decorative embossing patterns 60, and by choosing an embossing density of the code pattern 50 that is similar or equal to the embossing pattern 60. The embossing density is the ratio of embossed surface towards the non-embossed surface within the pattern, for example expressed by a number of embossing pins versus a number of blank pins. Also, a pitch of the embossed codes, in the variant shown the data-matrix-like codes, and a pitch of the added decorative embossing patterns are the same, to improve the continuity of the visual appearance between code pattern 50 and decorative embossing pattern 60.

Figure 15A:
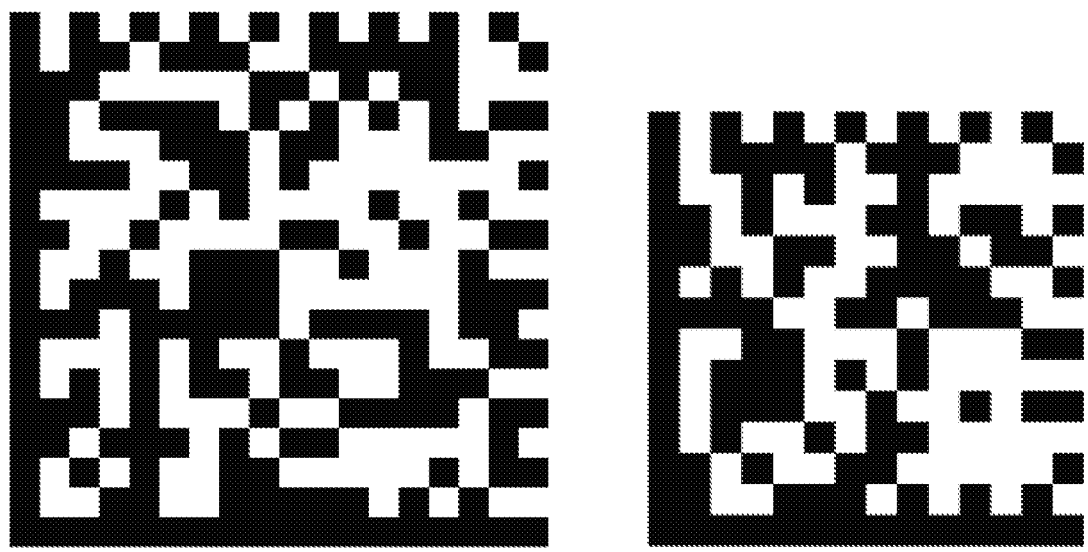
FIG. 15A-15C shows schematic representations of the creation of a combined embossed pattern in packaging material or foil, including a code patterns and decorative embossing pattern, wherein two different code patterns are used.
Figure 15B:
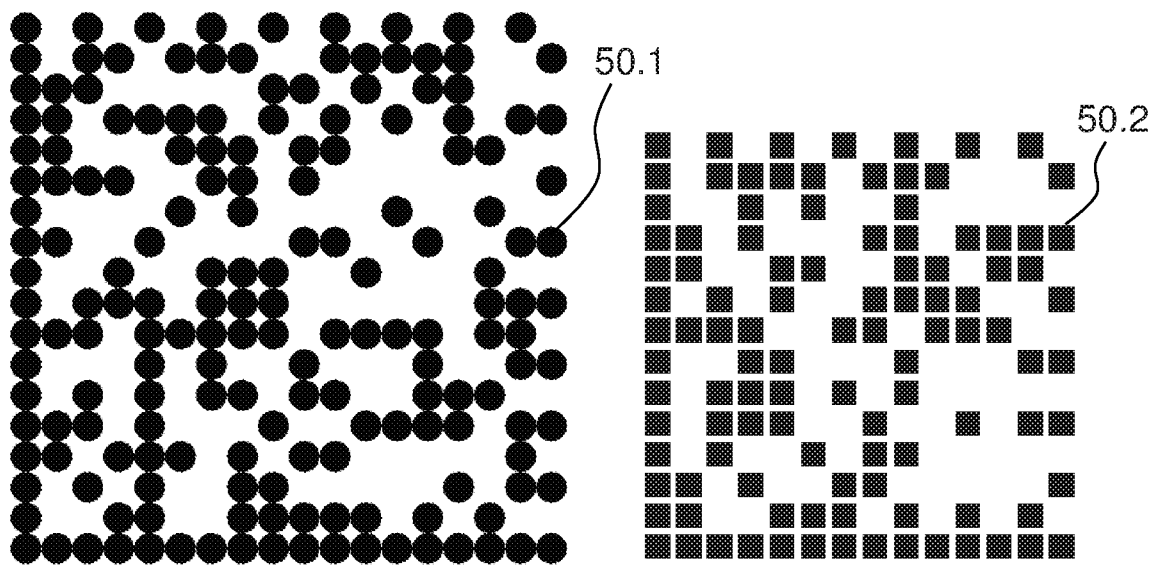
Figure 15C:
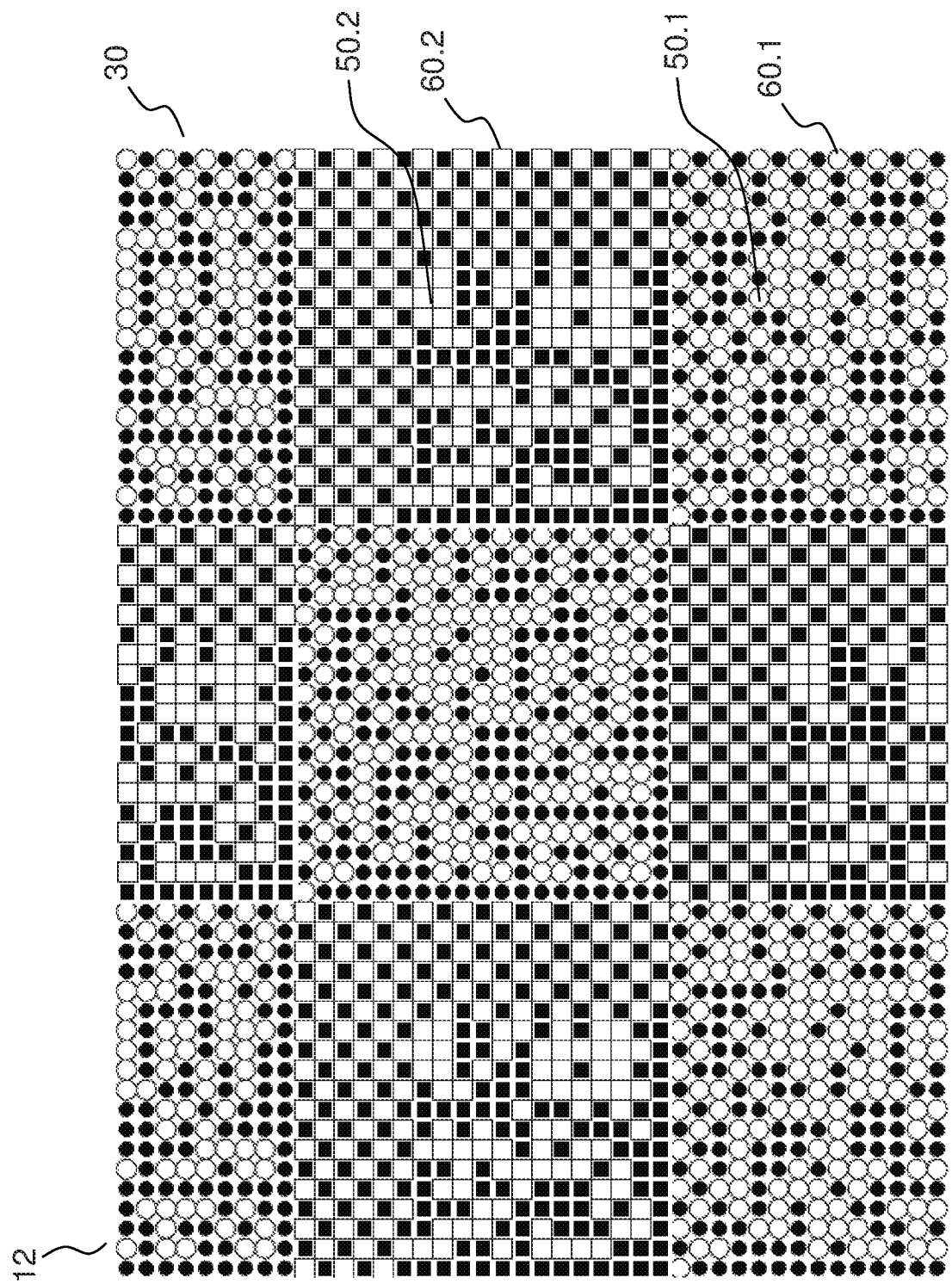

In another embodiment, as shown in FIGS. 15A, 15B, and 15C, the combined embossed pattern 30 can be made of several different data-matrix-like codes as code patterns 50 combined with a decorative embossing pattern 60, in the example shown, combined embossed pattern 30 includes of two different data-matrix-like codes 50.1 and 50.2 that are repeatedly arranged as an array in the combined embossed pattern 30. Decorative embossing patterns 60.1 and 60.2 are arranged there between to provide for a continuous patterning. FIG. 15A shows two different data-matrix-like codes that encode two different code information, the left data-matrix-like code including a first code information, being the website www.boegli.ch, and this first code information is encoded into the first data-matrix-like code having eighteen (18) to eighteen (18) square cells or pins, and the right data-matrix-like code including a second code information, being the text IL2123E-D, and the second code information is encoded into the second data-matrix-like code having fourteen (14) to fourteen (14) square cells or pins. The pitch for both data-matrix-like codes is the same. Next, FIG. 15B shows a first and a second embossing structure for the first and second data-matrix-like code 50.1, 50.2 is shown, that can be a part of the structuring of embossing devices 10, 20, representing the first and second data-matrix-like code of FIG. 15A, with an exemplary cell pitch of 0.3 mm. Moreover, the first embossing structure for code 50.1 in the left uses round-shaped embossing pins or teeth, for example but not limited to conical elements, cylindrical elements, or spherical round elements, while the second embossing structure for code 50.2 uses square-shaped embossing pins or teeth, for example but not limited to pyramid elements, rhomboids. Both have the same pitch, in both transversal and longitudinal direction.

Next, as illustrated by FIG. 15C, an embossing structure for embossing device 10, 20 is formed, each element of the array that forms combined embossing pattern 30 has either the first data-matrix-like code 50.1 or the second data-matrix-like code 50.2 arranged therein. In the variant shown, the first and second data-matrix-like codes 50.1, 50.2 are arranged to alternate along both the transversal and longitudinal direction for each square element of the array, the square elements being larger in size than both the first and second 2 data-matrix-like codes so that they can accommodate the matrix codes, having nineteen (19) to nineteen (19) cells an exemplary cell pitch of 0.3 mm. The first and the second data-matrix-like codes 50.1, 50.2 are both arranged to fit into each bottom left corner of the square elements of the array. Thereby, the remaining portion of the square elements is filled with a corresponding decorative embossing pattern 60.1, 60.2. In the variant shown, two different L-shaped areas 60.1, 60.2 that cover the upper side and the right side of the element that is not covered by the respective data-matrix-like code 50.1, 50.2, as represented in FIG. 15C, is filled with a decorative embossing structure.

For the first data-matrix-like code, the width of the L-shaped element is only one (1) cell, for the second 2D matrix code, the width is five (5) cells. In the variant shown a chess-board like structure, in which pins and blanks that alternating each other, is used to fill the L-shaped portion. Other types of decorative embossing structures could be used for the decorative embossing. Moreover, in the variant shown, the first and second codes 50.1, 50.2 are arranged in a corner of each square element of the matrix that forms the combined embossing pattern. But it is also possible that the first and second codes 50.1, 50.2 are arranged at another position within each square of the matrix, instead of being located in the left lower corner as shown in FIG. 15C, so that decorative embossing patterns 60.1, 60.2 can have a square shape that surround the corresponding first and second codes 50.1, 50.2. Also, as another aspect, the square elements accommodating the larger, first data-matrix-like code 50.1 is using embossing pins having a round shape, while the square elements using the larger, second data-matrix-like code 50.2 is using embossing pins having a square shape, to vary the overall appearance of combined embossed pattern 30.

Figure 16A:
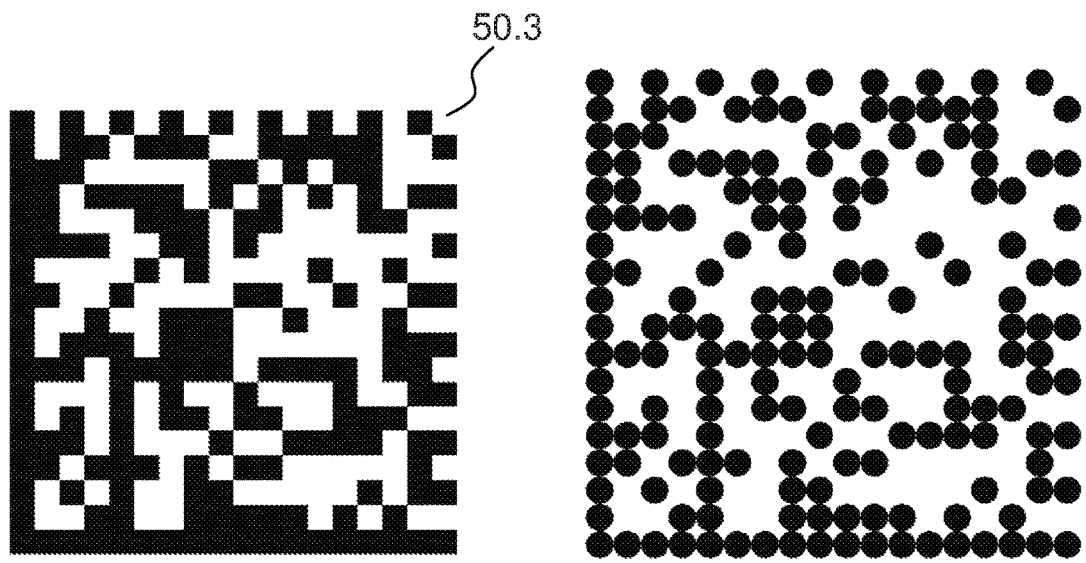
FIG. 16A-16C shows schematic representations of the creation of a combined embossed pattern in packaging material or foil, including a code patterns and decorative embossing pattern, wherein two different code patterns are used, and wherein one code pattern is arranged within the second, different code pattern.
Figure 16B:
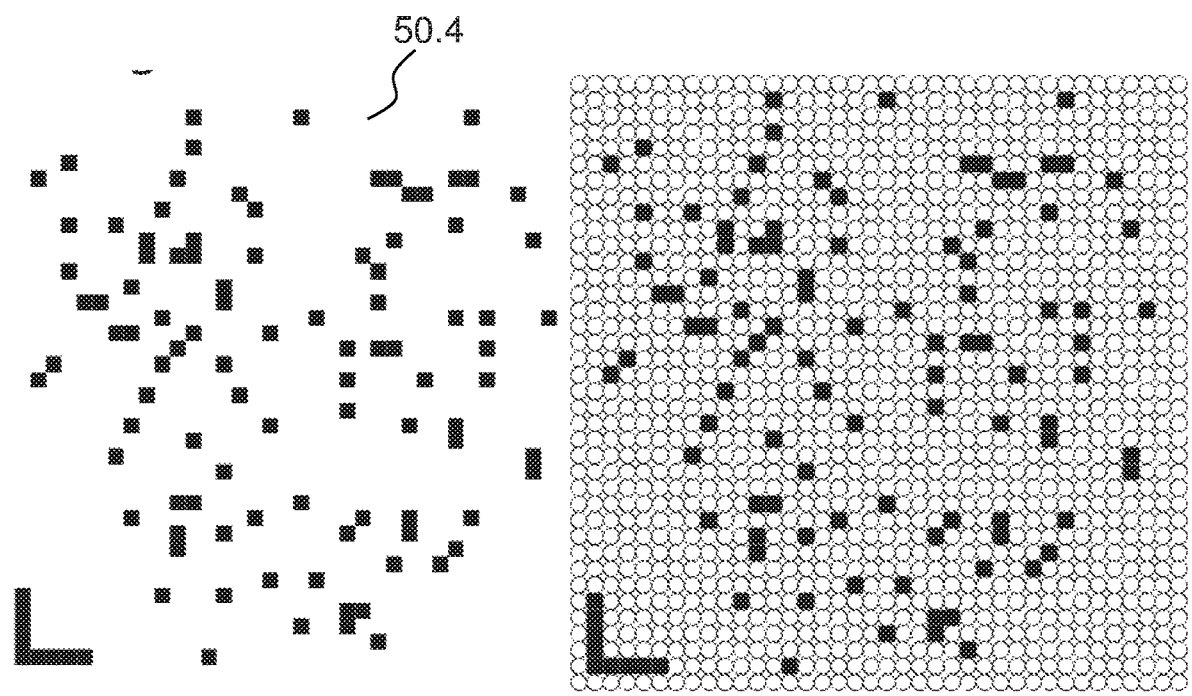
Figure 16C:
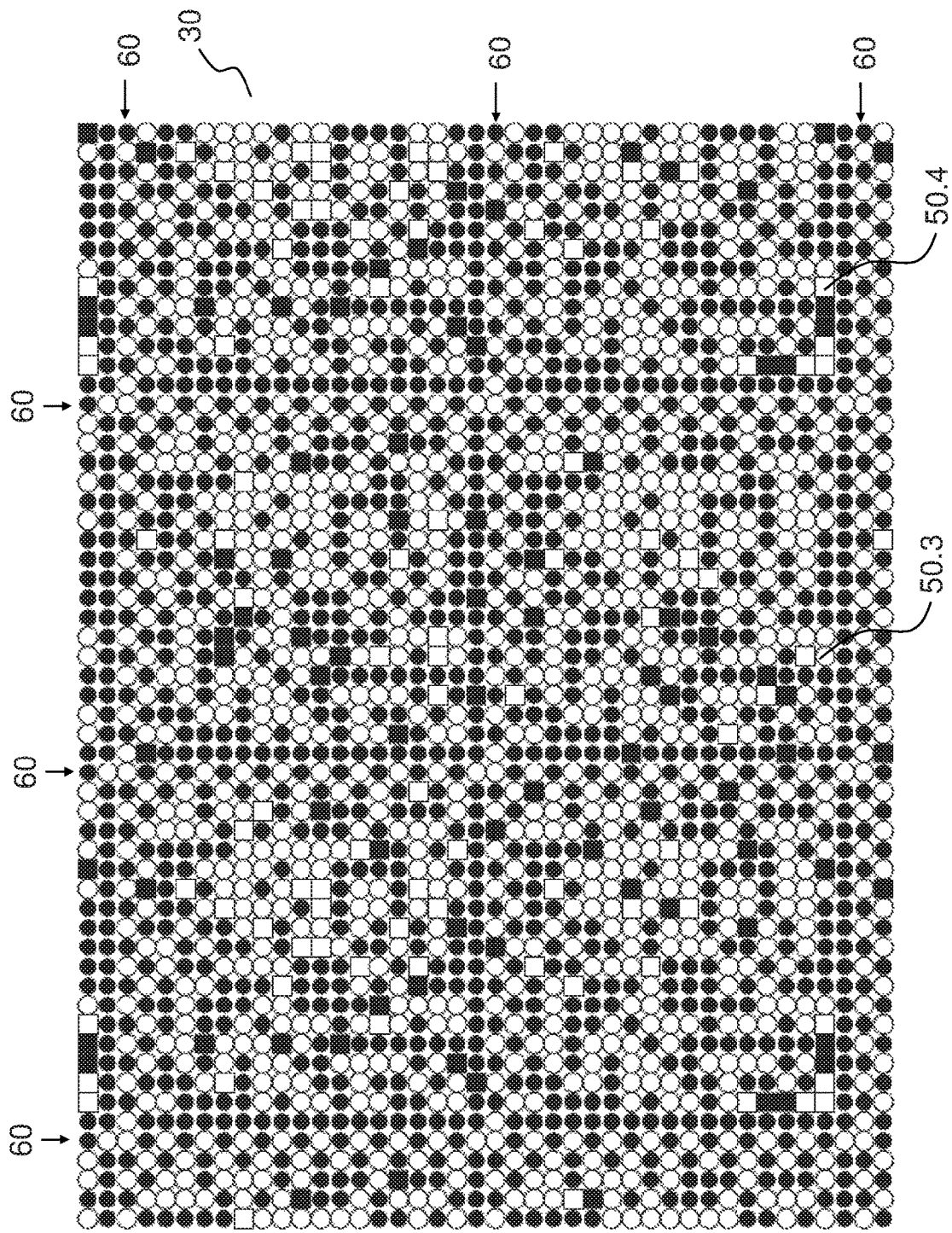

Next, according to another aspect of the present invention, as shown in FIGS. 16A, 16B, and 16C, the combined embossed pattern 30 can be made of two or more different data-matrix-like codes 50.3, 50.4 that are embossing using different embossing shapes for each pin or cell. In the embossing method and device, it is possible that a surface area that covers a first 2D code overlaps or is fully integrated into a surface area that covers a second 2D code. For example, as shown in FIG. 16A, a first 2D matrix code can encode first information with code 50.3, and for the embossing, round-shaped pins or teeth are used, as schematically shown on the right of FIG. 16A. First code 50.3 is made of a matrix of eighteen (18) to eighteen (18) cells. Next, as shown in FIG. 16B, a second data-matrix-like code can be used to encode second information with code 50.4, in which a different type of code is used, and having a different size from the first code 50.3, for example a 2D tag. This code is made of a matrix of thirty-eight (38) to thirty-eight (38) cells. For this code, square embossing pins or teeth are used, as shown in FIG. 16B on the right. Both the first and the second code 50.3, 50.4 will be embossed with the same pitch, in both transversal and longitudinal direction, but each pin is embossed with a differently shaped tooth, for example round versus square.

As shown in FIG. 16C, the combined embossing pattern 30 is made of an array of square elements. In this array arrangement, the first code 50.3 embossed with the square pins/teeth is arranged and repeated every 19$^{th}$ pin in both the transversal and longitudinal direction of the packaging material 12. Placed over the embossing of the first code 50.3, the second code 50.4 is repeated every 38$^{th}$ pin in both the transversal and longitudinal direction. For each embossed cell, a square-shaped filled embossing tooth or pin is used, while for each non-embossed cell, or blank cell, an empty square is shown. With this embossing method and device using the same pitch for both the first code 50.3 and the second code 50.4, but using different styles of pins or teeth to emboss the codes, two different codes can be overlaid over each other. In case an embossed cell of the first code 50.3 lies at the same location as an embossed cell of the second code 50.4, the cells can be embossed as full square cells, as shown exemplarily in FIG. 16C. In case only an embossed cell of the second code is present, the cell can be embossed with an empty square. Moreover, in case only an embossed cell of the first code is present, the cell can be embossed with a full circle.

In addition, as shown in FIG. 16C, at regular intervals between the first code 50.3, the first code 50.3 being smaller in surface area than the second code 50.4, decorative embossing patterns 60 are present, in the form of a single-cell wide line having alternating embossed and blank pins. The lines are arranged in an array with lines that repeat every 19 pin, in both transversal and longitudinal direction of material 12. In a variant, it is also possible that no additional décor embossing pattern 60 is present, and that the combined pattern 30 is merely composed of codes 50.3 and 50.4.

In a variant, based on the principle described above with respect to FIGS. 16A to 16C, instead of overlapping surface areas of different embossed codes 50.3 and 50.4, it is possible to overlap surfaces areas of one or more embossed code patterns with embossed surface areas of a decorative embossing pattern 60, for example by using different shapes of pins or negative/positive protrusions of the embossing device 10, 20, for example a round shape versus a rectangular shape, or other types of different geometries of the pins. The overlap can be done fully, for example such that a surface area of an embossed code 50.3, 50.4 is fully arranged and lies within a surface area of a decorative embossed pattern 60, or can be done partially, where a surface area of the embossed code 50.3, 50.4 is overlapping with a surface area of the decorative embossing pattern 60. A pitch of both longitudinal and transversal direction of the embossed code 50.3 and 50.4 and decorative embossing pattern 60 can be the same. Such arrangement allows to substantially hiding an embossed code 50.3, 50.4 within or next to a decorative embossing pattern 60 in the material 12 to a human viewer.

Figure 17:
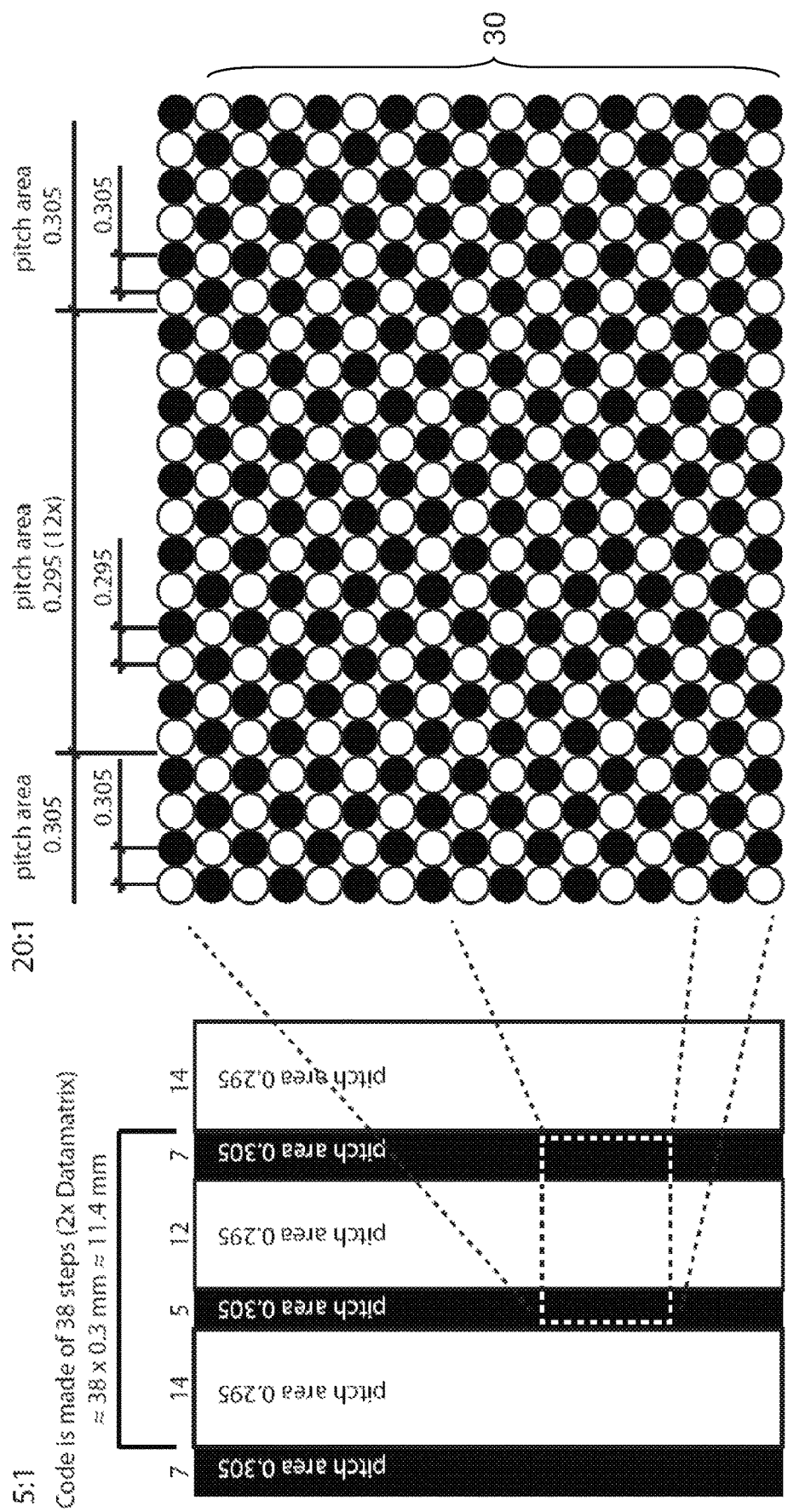
FIG. 17 shows a schematic representation of the creation of a combined embossed pattern in packaging material or foil, in which a chessboard checkered structure is used to represent a 1D barcode by varying the pitch of the embossing, combing decorative and code aspects into one pattern.

FIG. 17 shows another variant in which as the code pattern, a 1D bar code principle is used to embed code information. For example, as shown on the left of FIG. 17, a 1D barcode is shown that used for the embossing, and it is made of solid and white, non-solid, or blank lines having a specific width representing a number or other type of information. For embossing purposes to generate combined embossed pattern 30, the solid lines are associated to a first embossing pitch p1, in the example shown 0.305 mm, while the blank lines are associated to a second embossing pitch p2, in the example shown 0.295 mm. The difference between pitch p1 and p2 is chosen to be relatively small, for example preferably less than 7.5%, more preferably less than 5%, so that codes embedded into combined embossed pattern 30 of material 12 cannot or only difficultly be seen by human eye. The right-hand side of FIG. 17 shows an exemplary representation of a part of the 1D bar code shown on the left, for forming the embossed pattern 30 with a male and female embossing die 16, 14, or other type of embossing device. For example, the blank line represented by a width of twelve (12) units shown in the dashed area of FIG. 17 is represented by twelve (12) lines of embossing pins having a pitch p2 of 0.295 mm. The two areas that are adjacent to the blank area represent the solid lines, having a different pitch p1 of 0.305 mm.

Figure 18:
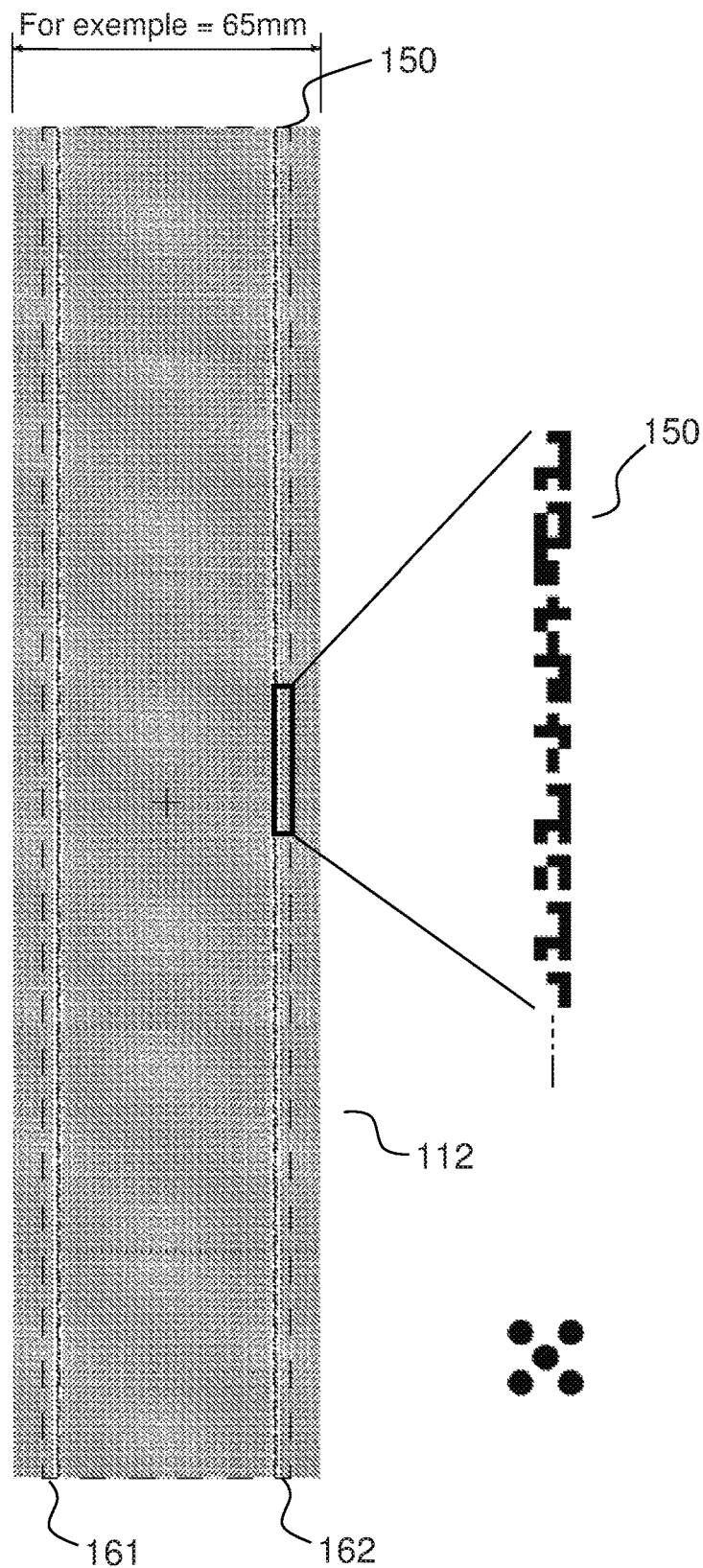
FIG. 18 shows a schematic representations of the creation of combined embossed pattern in packaging material or foil, in which a wallpaper type code is embedded in decorative embossing patterns.

According to another aspect of the present invention, a packaging material 112 can be embossed with an embossing device 10, 20 such that the combined embossing pattern 130 is provided by combining decorative embossing patterns 160 with a wallpaper code 150 as a code pattern, as shown in FIG. 18, the wallpaper code 150 including a series of codes that are repeated for redundancy purposes. In the variant shown, a strip of packaging material 112 is provided, with a decorative embossing pattern 160 shown being arranged in a series along the longitudinal extension of packaging material 112. For example, the decorative embossing pattern 160 could be a company or brand logo or symbol, product logo or symbol, or a simple decorative pattern. Two gaps 161, 162 are arranged along the longitudinal extension of material 112, having no embossing therein, other than a linearly-arranged embossing that represents the wallpaper code 150.

Figure 19A:
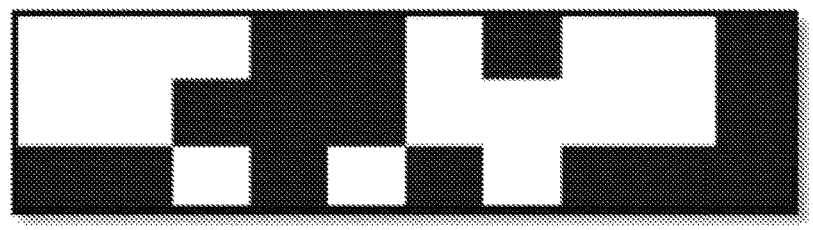
FIGS. 19A and 19B shows a code element used for the wallpaper type code, that can be presented as an original, as an inverted code, as a mirrored code, and an inverted-mirrored code, to vary a visual aspect of the code.

In the variant shown, the two gaps 161, 162 in the decorative embossing patterns 160 can be less than 3 mm thick, and the gaps including a series of adjacently arranged codes made of three (3) to ten (10) cells, shown in the zoom-in section of FIG. 18, and shown individually in FIG. 19A to form the wallpaper code. The embossing can be done by pins or teeth arranged in a matrix with square cells. A pitch can be chosen to be smaller than 0.5 mm, so that the codes hardly viewable by human eye, and appear more like a decorative strip. Also, it is possible to emboss material 112 with a wallpaper code 150 that is less deep than the embossing of the decorative embossing pattern 160 to further reduce the visibility and detectability of the codes, as compared to the decorative embossing patterns. Wallpaper code 150 can be a series of the same code that is changed by presenting at least one of an original code, a mirrored code, an inverted code, and an inverted mirrored code, such that two immediately adjacent codes of the wallpaper code 150 are not the same in appearance.

Figure 19B:
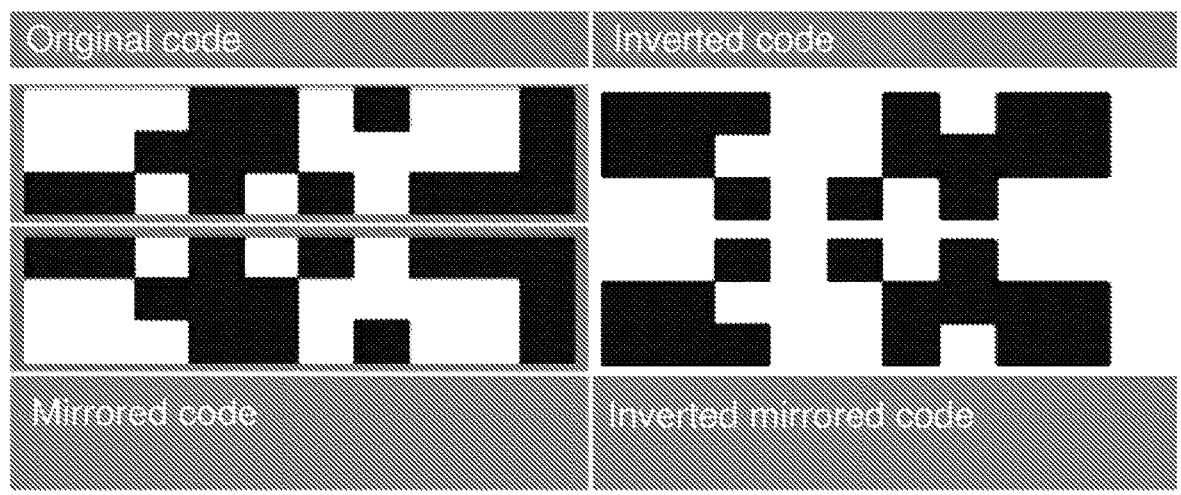

To provide an appearance of randomization of the wallpaper code, a series of the basic code shown in FIG. 19A can be continuously arranged along a line, but by randomly alternating a presentation between four or more different variants, including an original presentation of the basic code, an inverted presentation of the basic code, a mirrored representation of the basic code, and an inverted-mirrored version of the basic code, as shown in FIG. 19B.

Figure 20:
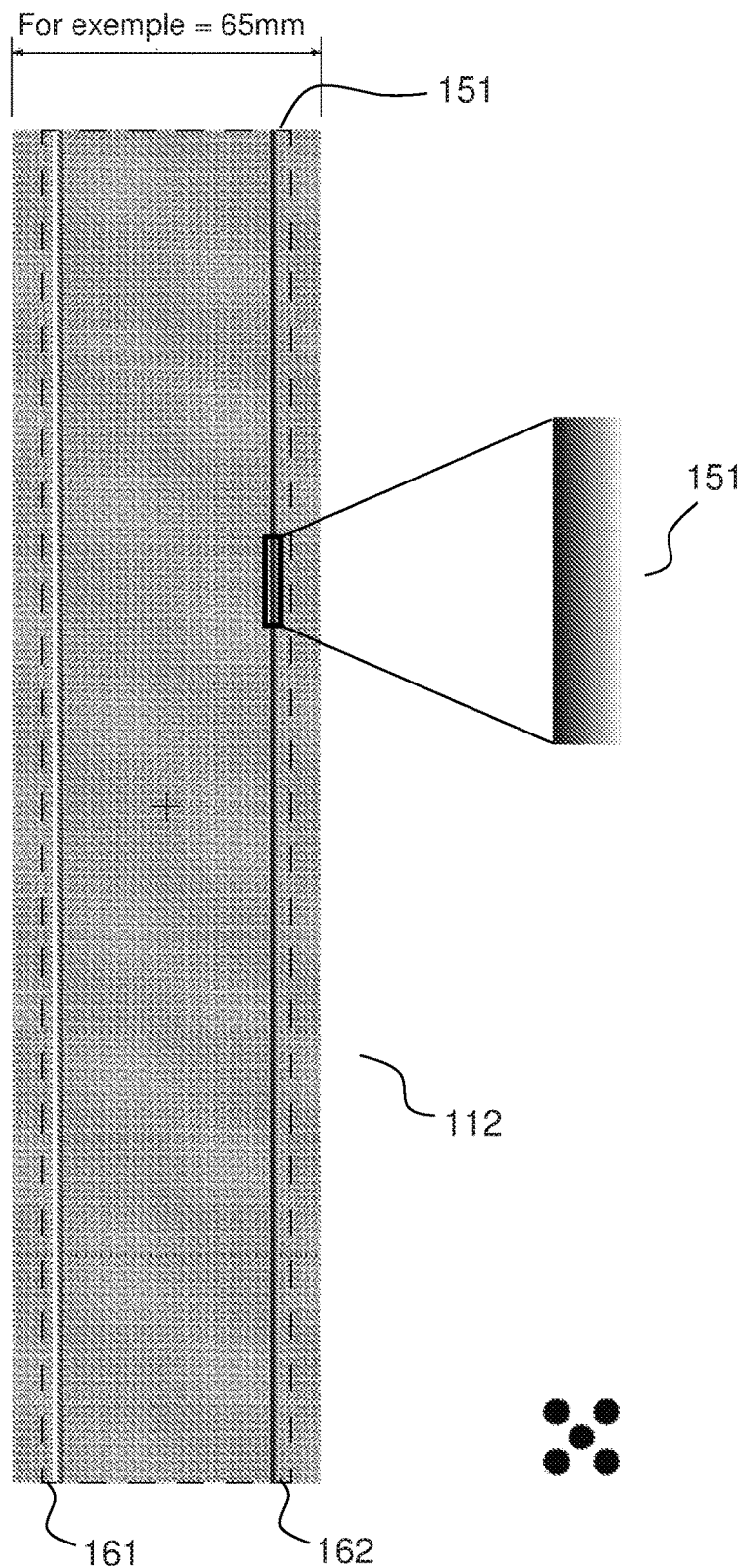
FIG. 20 shows a schematic representations of the creation of combined embossed pattern in packaging material or foil, in which a light diffractive code is embossed in decorative embossing patterns.

In FIG. 20, a similar embossing scheme is shown as shown in FIG. 18, but instead of embossing two thin strips of wallpaper code 150 into a packaging material 112, a diffractive pattern 151 is embossed, the diffractive pattern may be at least partially combined of an embossed code, for example a wall paper code itself, a series of 1D bar codes, a series of 2D matrix codes. The diffractive pattern 151 is also arranged as two thin strips, with a code pattern that can repeat itself, and is shown in the zoomed-in section of FIG. 20. For example, to form the diffractive pattern, a diffraction pitch can be used for different types of light, for example for UV light, NIR light, or visible light, and can be in a range between 300 nm to 5 µm can be chosen, and a depth of the embossing can be chosen to be in a range between 100 nm and 1 µm.

Figure 21:
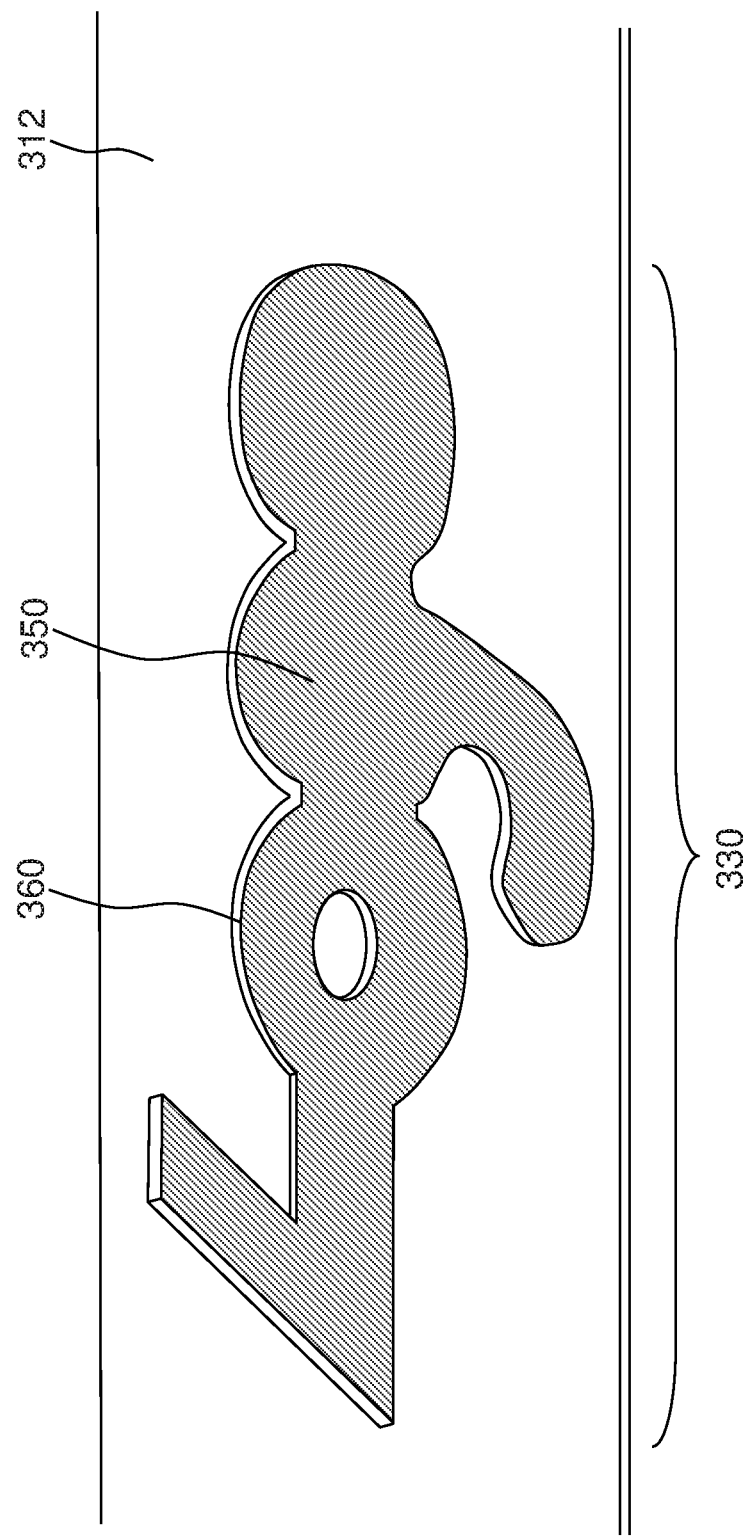
FIG. 21 shows a combined embossing pattern where a logo is embossed in a packaging foil, and in the valley areas of the logo are embossed with an array of diffractive code patterns.

FIG. 21 shows an exemplary embossed material or film 312 that has been decoratively embossed to show a logo, herein symbolized by the word "logo," as the decorative embossing pattern 360, and a code pattern 350 in the form of a diffractive pattern arranged in repetitive arrangement. In this respect, codes that are represented in code pattern 350 would not be visible to a human eye, and would simply appear as a finer embossed decorative structure within the logo, for example having a satinizing effect.

Figure 22E:
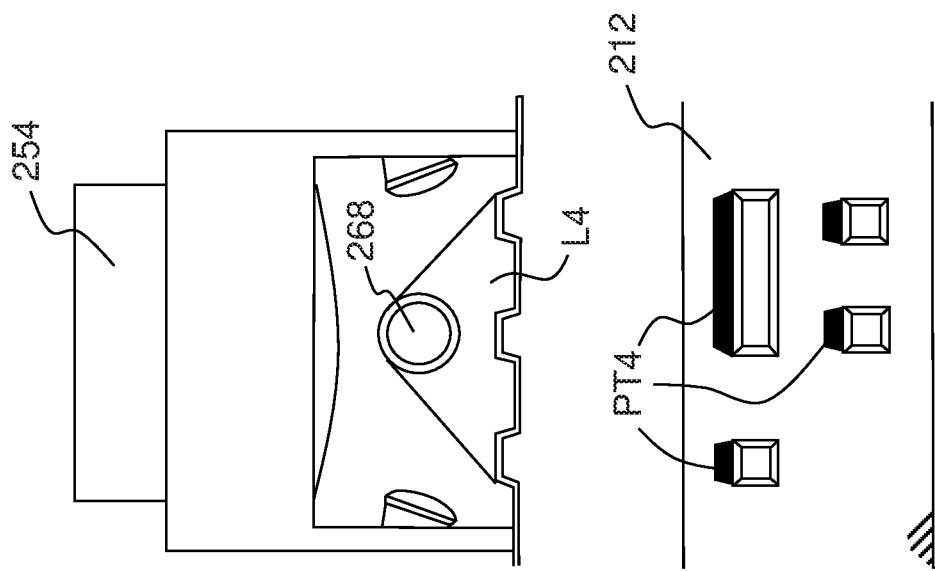
Figure 22D:
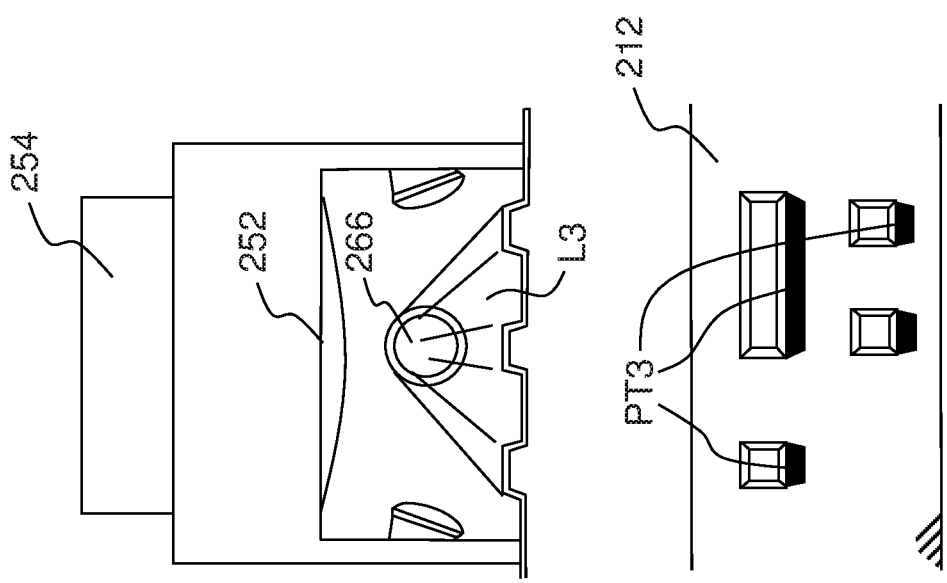

According to another aspect of the present invention, a method and device for reading an embossed code is provided, by using a plurality of side or oblique illumination sources. This method, and a device for reading the embossed code is shown with respect to FIGS. 22A to 22E, showing different side cross-sectional views and top views of the embossed material 212. In FIG. 22A, a side cross-sectional view and a top view of an embossed material 212 is shown, for example a cardboard package for a tobacco or food product, having an embossed structure 230 embossed therein, representing code information. Embossed structure 230 includes a plurality of protrusions 232. In the example shown, protrusions 232 are arranged and aligned along the longitudinal direction or y-direction of material 212, and are also arranged and aligned along the transversal direction or x-direction of material 212, to be arranged in a grid.

Next, a code reading device 200 is placed over embossed structure 230 of material 212. Code reading device 200 is shown to have a reading and illumination opening 267 that include a multitude, e.g., in the non-limiting example four (4) illumination sources 262, 264, 266, 268 with illumination source 262 configured to provide for a light beam L1 in the y-direction or along the longitudinal direction of material 212, illumination source 264 configured to provide for a light beam L2 in the negative y-direction, and illumination source 266 configured to provide for a light beam L3 in the x-direction or transversal direction, and illumination source 268 configured to provide for a light beam L4 in the negative x-direction or transversal direction. A controller that can be a part of code reading device 200 can be used to selectively turn on and turn off light beams L1 to L4 with the respective illumination source 262, 264, 266, 268. Moreover, a frame 271, 273 is provided that allows abutting code reading device 200 on top of embossed material 212.

For each illumination light beam L1 to L4 from illumination sources 262, 264, 266, 268, a shadow pattern PT1, PT2, PT3, and PT4 will be created on an upper surface of material 212, as the protrusions 232 will create a shadow for each oblique light beam. These shadow patterns PT1 to PT4 can be established even if the embossing creates very small protrusions. Also, the length of an individual shadow measured in a direction of the propagating light of the light beam L1 to L4 further includes information on a height of a respective embossed cell. Shadow patterns PT1, PT2, PT3, and PT4 can be captured as images, and with an image processing algorithm the originally embossed code can be reconstructed, and the code information of the code can be read and extracted, for example by a data processor of the code reading device, or by an external device that is connected to the code reading device 200, for example a smart phone, tablet, portable computer, desktop computer.

For example, based on the captured images of the projected shadow patterns PT1, PT2, PT3, and PT4, for each shadow pattern sequentially an edge-extraction algorithm can be applied to extract the edges of the embossed structure on the opposite end of the illumination direction of light beam L1, L2, L3, and L4. By combining the extracted edges, a closed contour can be calculated locally for each structure embossed. Finally, in the simplest case of a binary encoding, the estimated representation of the extracted code-pattern image can be formed by simply filling the closed contour and thus creating a black and white image of the 2D coding. Thereafter, with a pattern recognition algorithm, the black-and-white data representation of the embossed code can be analyzed to read the code and extract the code information.

Multi-level coding approaches can also be implemented by taking into account the variable shadow-projection length of the embossed identification marks of different height. In this case, the applied coding has to fulfil boundary conditions such that variable-length shadow projections have the property that the height of embossed identification marks can be determined independently using the different directions of the projected light illumination, e.g., by using simple geometrical calculations. Instead of black and white images, multi-level gray scale images can be created which represent the estimated height of the embossed features. Thereafter, soft-decoding algorithms can be utilized to extract the originally encoded information.

Moreover, code reading device 200 includes a lens 252, preferably a macro lens objective, and an image sensor device 254, and together with lens 252, covers a field of view that includes the embossed structure 230, so that all protrusions 232 of structure 230 can be viewed. In a variant, the code reading device 200 does not have an image sensor device 254 itself, and can be clipped onto an image sensor part of a smart phone or tablet, and can be connected and powered via the smart phone or tablet, for example via the USB port. Application software running on a smart phone, tablet, or other type of data processing device can be used to control the illumination of code reading device 200, and the image capturing of the image sensor provided by the smart phone or tablet. Image and data processing can also be implemented in the application to reconstruct the original code from the shadow patterns PT1, PT2, PT3, and PT4, and the code information can be extracted.

Figure 23A:
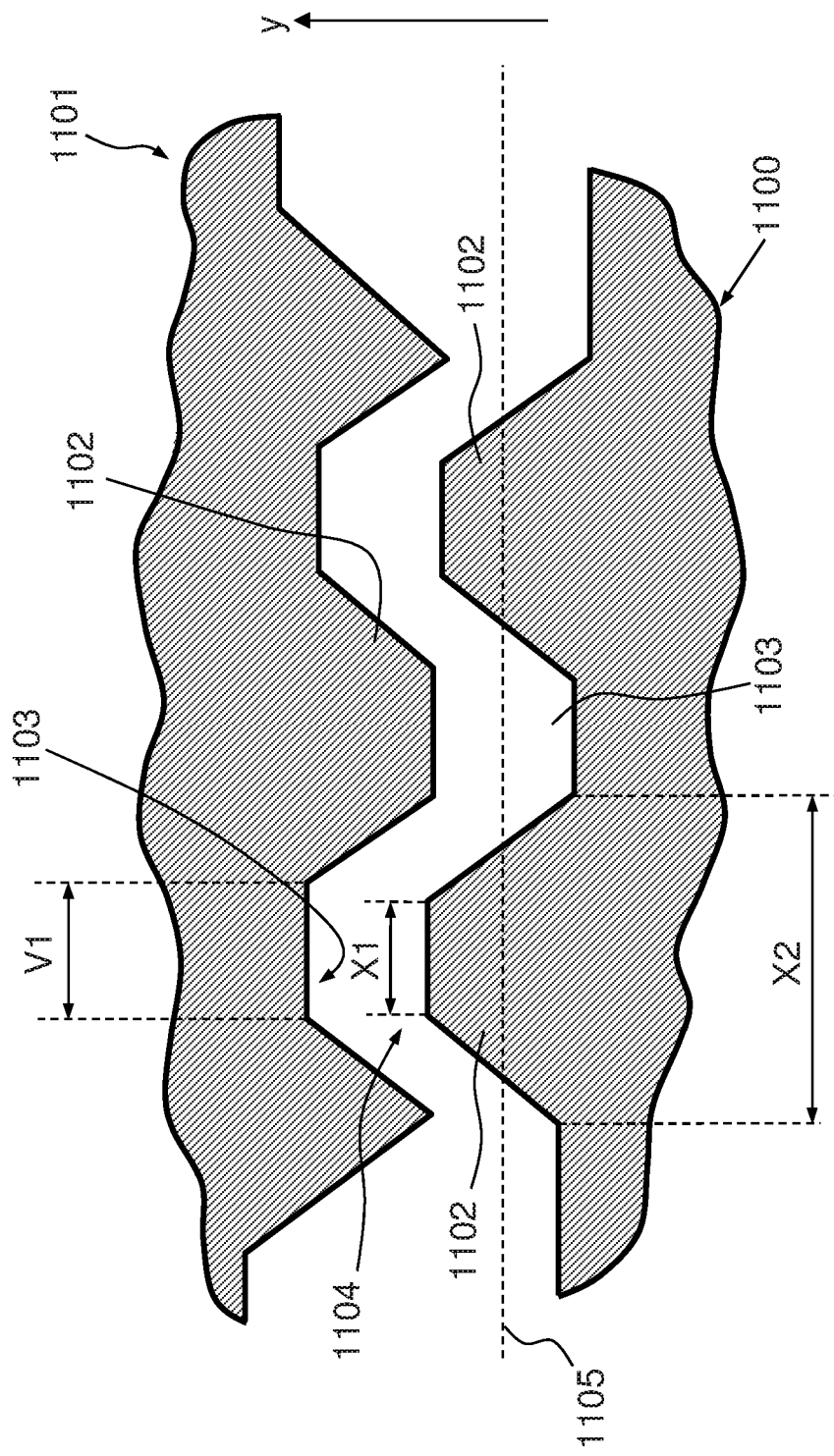
FIGS. 23A, 23B, and 23C shows a cross-sectional side view and a top view of a male and female embossing structure having a substantially constant gap width between male projections 1102 and corresponding female negative projections 1103.
Figure 23B:
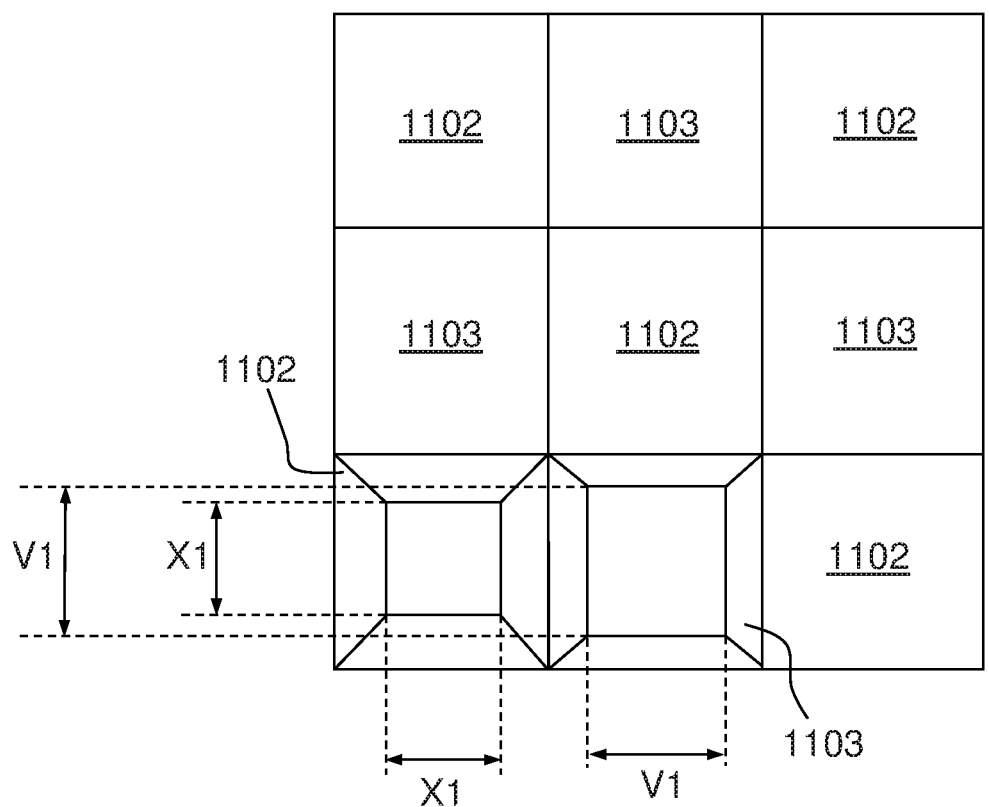

FIGS. 23A and 23B shows a cross-sectional side view a male and female embossing structure and a top view of positive and negative projections having a substantially constant gap width between male positive projections 1102 and corresponding female negative projections 1103, this structure being used to emboss the combined embossed pattern into a packaging material 12, according to another aspect of the present invention. The projections shown can be the embossing structures of an embossing device 10, 20, for example embossing rollers P5, M5 as shown in FIG. 6 or embossing dies P10, M10 as shown in FIG. 13. As shown in FIG. 23A, a sectional view is provided at the nip of two rollers 1100, 1101, for example through a first roller 1100 and a second, counter roller 1101, the two rollers being position such that positive projections 1102 from the first roller 1100 are positioned for embossing in front of negative projections 1103 of the second roller 1101, and negative projections 1103 from the first roller 1100 are positioned for embossing in front of positive projection 1103 of the second roller 1101. In the illustration of FIG. 23A, the distance 1104 between the first and second rollers 100, 1101 is filled with the packaging material 12, 112, 212, 312 being embossed, hinting a finite thickness of the foil material being embossed. The specific surfaces of the positive projections 1102 are squares with a side length X1, while the specific surfaces of the negative projections 1103 are squares with a side length 1104, as shown in FIG. 23B, whereby the equation X1<V1 is respected. The value of X1 is deliberately made inferior to the value of V1 to take into account the specific thickness of the packaging material 12, 112, 212, 312 and achieve a seamless and gapless joint of the projections from the first roller 1100 with the projection from the second roller 1101.

FIG. 23A further shows a mean level of the surface of the first roller 1100 by means of dotted line 1105. The height of a positive projection 1102 measured from this dotted line 1105 is the same as the depth of a negative projection 1103 measured from this dotted line 1105. The sum of the height and depth indicated herein is typically in the order of 40 μm, which is similar to the uncompressed thickness of the packaging material 12, 112, 212, 312 to be embossed, corresponding to an average gap width WA. A distance separating two specific surfaces of negative projections 1103 is indicated by X2.

FIG. 23B shows an top view of a checkered layout of positive and negative projections 1102 and 1103 on a surface of the first roller 1100. For a better readability of the figure, only one (1) of each a positive 1102 and a negative projections 1103 is illustrated with their respective specific surface, i.e., a square surface with side value X1 and V1 respectively. As a result of embossing with the embossing structures of FIGS. 23A and 23B, the embossed packaging material 12, 112, 212, 312 comprises pyramidal structures, the top of which is truncated. Hence light projected on a surface of packaging material 12, 112, 212, 312 containing such embossed structures would typically reflect a lesser intensity of light than a surface embossed with complete pyramidal structures, making any such embossed patterns, for example the combined embossed pattern 30 less visible to a human eye.

Figure 23C:
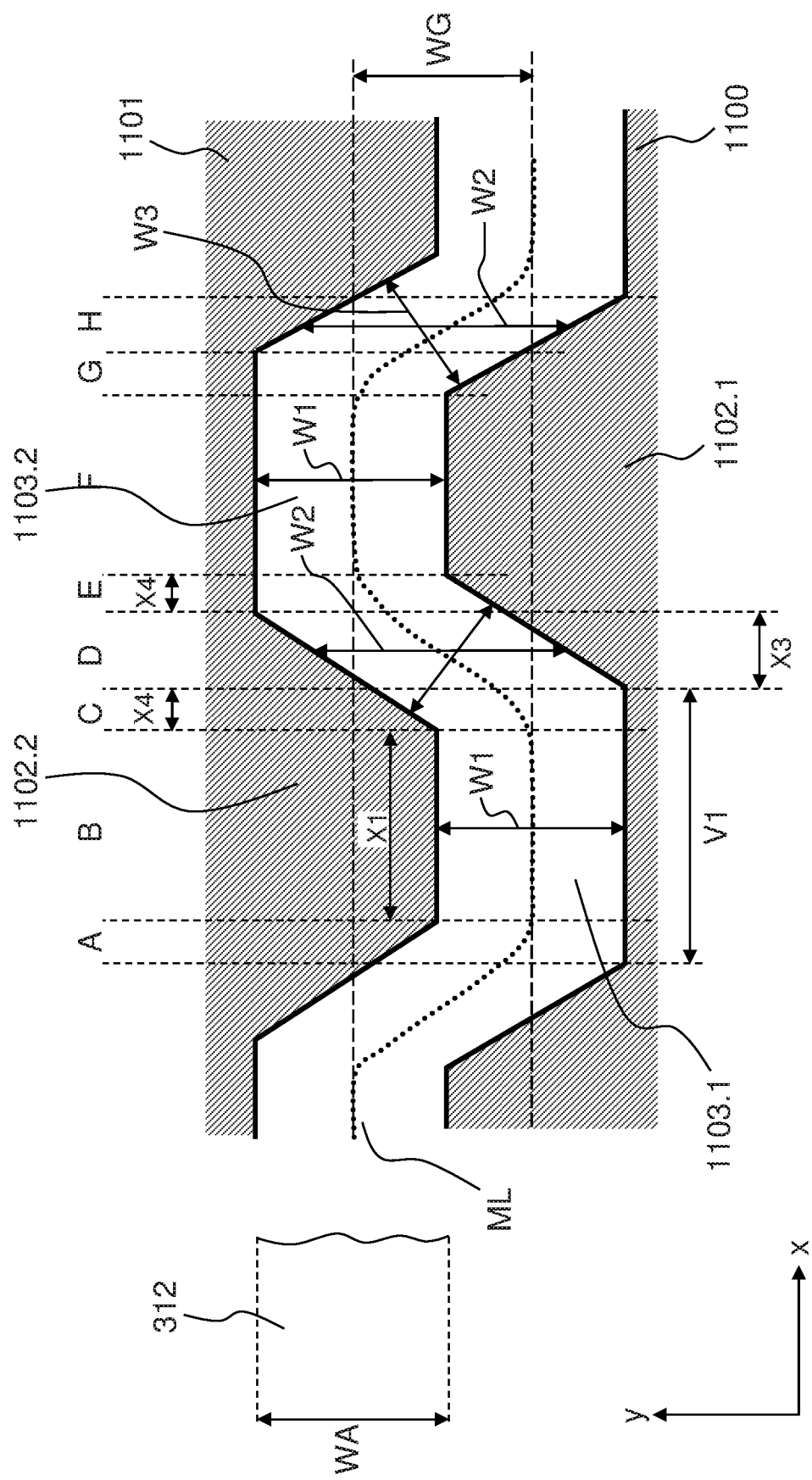

As shown in FIG. 23C showing the cross-sectional view at the embossing or nipping gap, or the closest position between two rollers 1100, 1101, a distance between an upper surface of the projections 1102.1, 1103.1 of the first roller 1100 and between a lower surface of the projections 1102.2, 1103.2 of second roller 1101 is variable. In an Y-direction, there is a constant gap width or nipping gap W1 at areas B, F, facing the truncated top X1 of the positive projections 1102, while there is a constant gap width or nipping gap W2 between where the oblique side walls D, H, of projections 1102, 1103 face each other. This means that at areas where the projections are flat, i.e., parallel to the X-direction, or parallel to a rotational axis of the rollers, the gap width W1 is constant. The gap width W2 is wider than gap width W1. In addition, in areas A, C, E, G between a flat portion of a projection and an oblique portion of a corresponding projection, along a distance X4 along the X-direction, the gap width varies from W1 to W2, or from W2 to W1. An average thickness or width WG of the nipping gap lies between W1 and W2, and substantially corresponds to the thickness of the untreated and un-embossed packaging material 312, having a thickness WA, as schematically shown in FIG. 23C on the left side. The average width is indicated between two dotted lines that indicate the average height of the projections of each roller 1100, 1101.

In addition, as shown in FIG. 23C, a gap width W3 between the side walls of a positive protrusion and a corresponding negative protrusion, measured perpendicular to the side walls, is substantially the same as gap width W1. As a packaging material 312 will be embossed when passed through gap, the gap width seen by the embossed material is a substantially constant distance, being W1 between the truncated flats and W3 between the side walls, to be substantially equal to a thickness WA of packaging material 312. In other words, when packaging material 312 is being embossed, a middle line or area of packaging material 312 will follow a middle line ML that is shown as a dotted line in FIG. 23C, and a distance from middle line ML to the side walls of positive and negative projections 1102, 1103 will be substantially equal to WA/2, or W1/2, or W2/2.

With these structural arrangements of positive and negative projections 1102, 1103 on the embossing device, a substantially constant embossing gap width or thickness W1, W3 is provided, and also provides for a cross-sectional surface of a positive projection 1102 of a first roller is inversely congruent to a cross-sectional surface of a corresponding negative projection 1103 of a second roller. This allows the creation of a less visible embossing of packaging material 312, but also the establishment of less strain on material 312 when being embossed, to avoid strains on the packaging material 312. For example, less tensions or tensile stress is created on to tobacco paper or wrapping material, and tearing or puncturing of the material is prevented. Moreover, the constant embossing gap width or thickness W1, W3 does not only take the thickness WA of packaging material 312 into account, but also an additional thickness value to take into account a surface roughness of packaging material 312, internal structuration of packaging material 312, environmental conditions at the embossing process that may lead to a different dimension of packaging material due to humidity and temperature, and if packaging material 312 has been painted or otherwise coated before embossing, the constant embossing gap width or thickness W1 also takes into account an additional thickness provided by the printing or coating layers. In addition, it can also take into account machining tolerances from manufacturing method that is used to manufacture the male and female embossing structure.

Figure 24A:
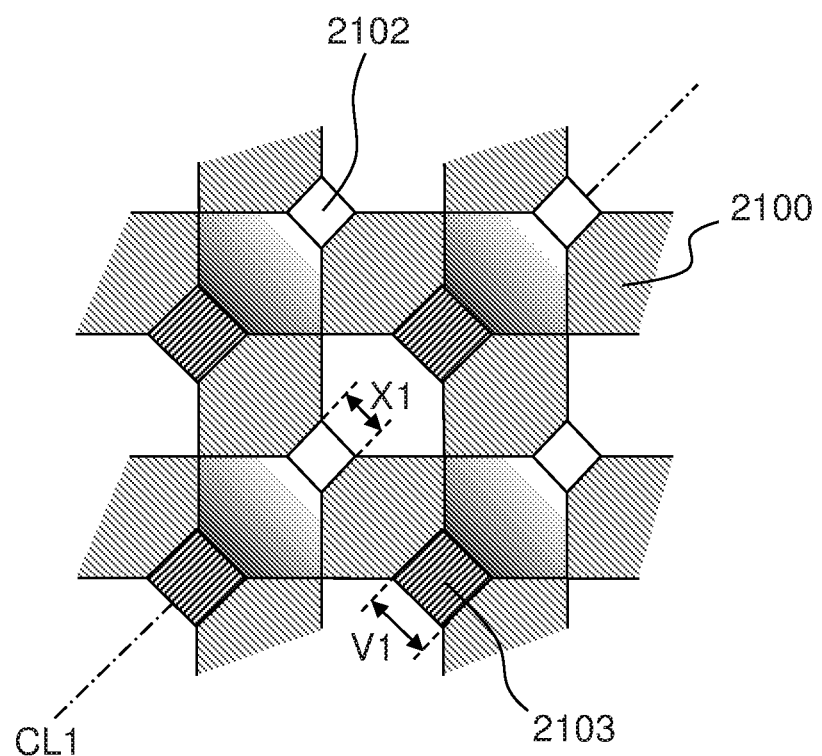
FIG. 24A shows a top view and FIGS. 24B and 24C show perspective views showing details of a surface of an embossing structure using polyhedral patterns.
Figure 24B:
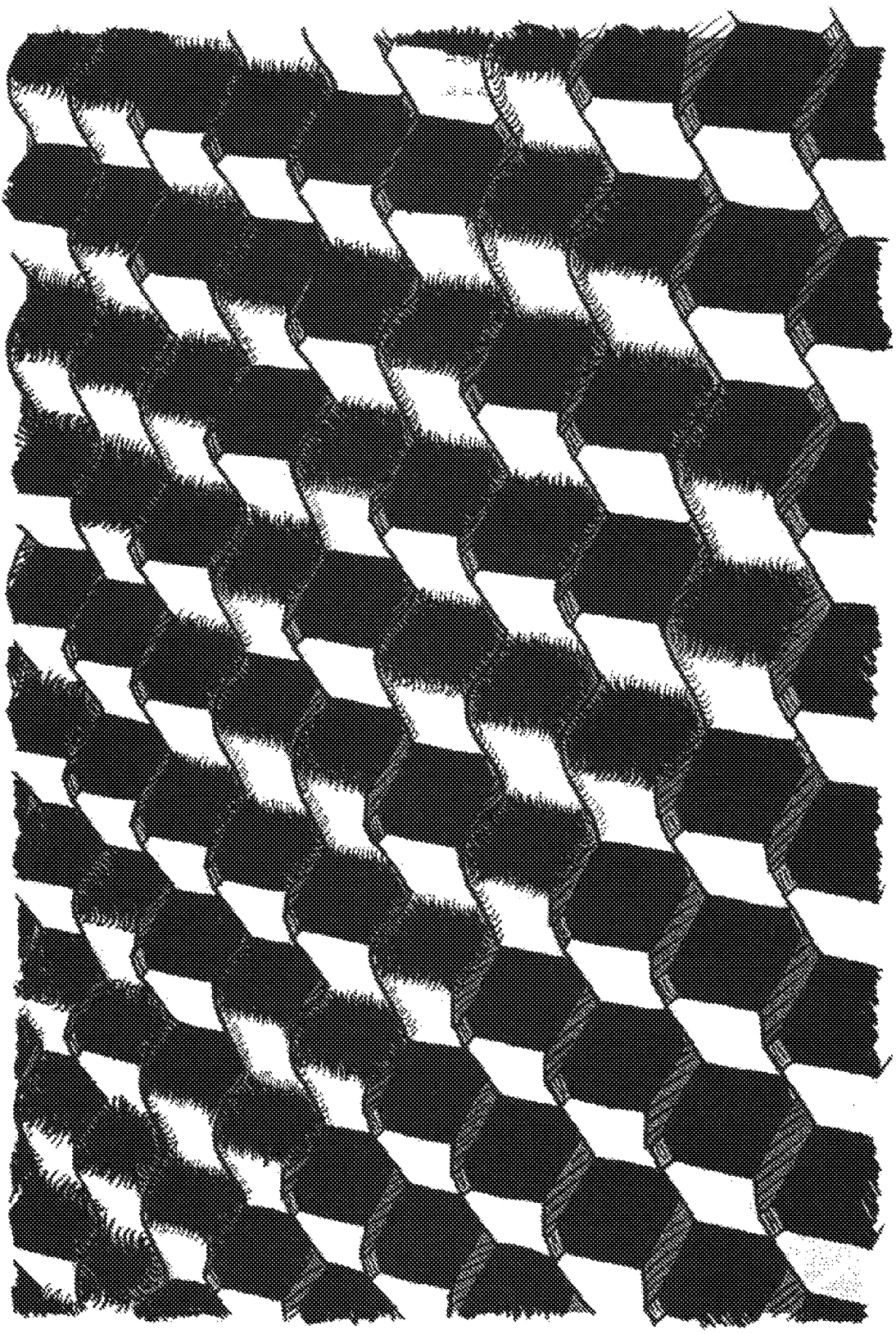
Figure 24C:
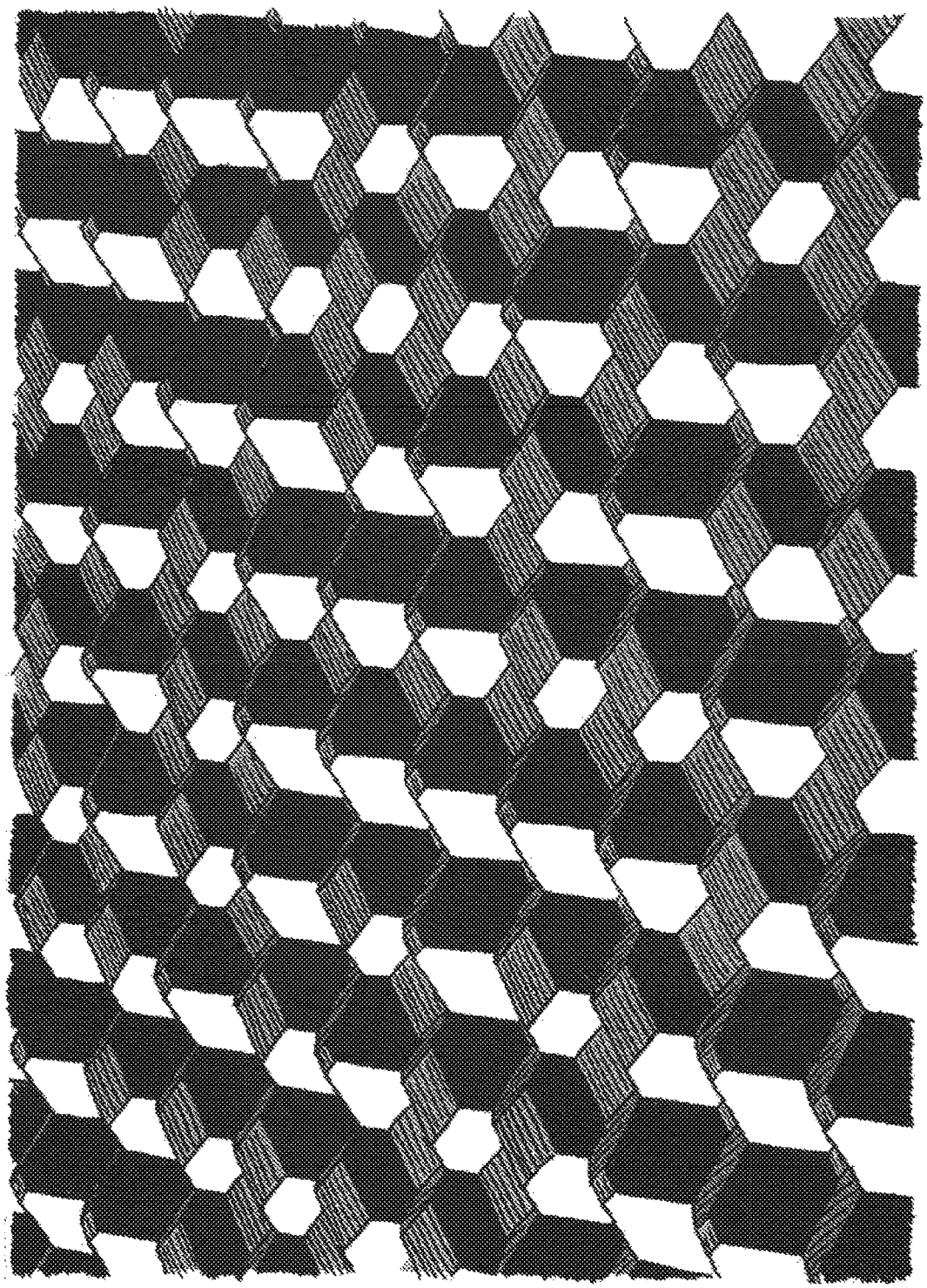

FIG. 24A shows a top view and FIGS. 24B and 24C show perspective views showing details of a surface of an embossing structure using polyhedral patterns having four faces, for example for P5, M5, P10, M10 embossing device 10, 20, in which positive and negative embossing projections 2102, 2103 are arranged to form corners of a truncated octahedron. The embossing teeth, pins, or structures are made of a partial polyhedral structure, where a part or a partial polyhedral structure forms a protrusion, tooth, or pin for the embossing, and an inverse congruent element of the part or partial polyhedral structure forms the corresponding negative protrusion or indent. The cross-sectional view of FIG. 23C could be a cross-sectional view along line CL 1 of FIG. 24A of the polyhedral pattern. This embossing structure shows larger truncated surface areas or flats, in the form of a square, for the negative projections 2103, as compared to the truncated surfaces areas or flats, also in the form of a smaller square, for the positive projections 2102. The embossing gap between roller 2100 or embossing die, and the corresponding embossing roller or die, is formed to respect an overall thickness of the un-embossed packaging material 12, by also taking into account the surface roughness and material structure of the packaging material 12 that are present even before the embossing takes place. Also, it is also possible that a width of the embossing gap is designed and manufactured to take into account a thickness of the packaging material 12 that has been printed with an ink layer before the embossing process 12, thereby thickening the original dimensions of the packaging material 12.

In a variant, to emboss packaging material 12 with a combined embossed pattern 30 including decorative embossing pattern 60 and code pattern 50, it is possible to use a different type of embossing structure, as the one described with respect to FIGS. 24A-24C, using voluntary deviations from the inversely congruent structure of the male/female embossing structure. For example, it is possible to use a set of embossing rollers including a male die roller 5P and a female die roller 5M co-operating with each other, a surface of the male die roller having texture elements, and a surface of the female die roller having texture elements. Moreover, the texture elements of the female die roller and the texture elements of the male die roller that are associated to the texture elements of the female die roller, include intended deviations so that a texture element of the female die roller and an associated texture element of the male die roller are not inversely congruent, the intended deviations include (i) an angular deviation between a side of the texture element of the female die roller and an associated side of the texture element of the male die roller being up to 20° and (ii) a linear deviation between the texture element of the female die roller and an associated texture element of the male die roller being above 15 μm in an axial and a radial direction. Moreover, it is possible that the texture elements of the male die roller, which are assigned to the texture elements of the female die roller, have facets configured to increase a local pressure. In addition, the texture elements can have a structure that is configured to produce the combined embossing pattern 30 in the packaging material 12. These embossing structures and texture elements are described in U.S. Pat. No. 9,636,885, this reference herewith being incorporated by reference in its entirety.

In a variant, to emboss packaging material 12 with a combined embossed pattern 30 including decorative embossing pattern 60 and code pattern 50, it is possible to use another type of embossing structure, as the one described with respect to FIGS. 24A-24C, in which light scattering elements are provided on at least one of a side surface, bottom surface, and top surface of a structural element. This allows embossing at least the code pattern 50 of the combined embossed pattern 30 as such light scattering elements, while the decorative embossing pattern 60 can be embossed as the structural element. For example, at least one structural element of corresponding structural elements of a collaborating roll pair including a female embossing roll M5 and a male embossing rolls P5 is provided on at least one of a bottom surface, top surface, and side surface, or in its immediate surroundings, with light-scattering elements, the height (H) of which can be in a range between 10 μm to 150 μm, and the foot width is at least 10 μm, forming part of the structure to form the code pattern 50. Moreover, the depth or height of the structural elements that form the structure for the decorative embossing pattern 60 is in a range between 25 μm to 400 μm. These embossing structures and texture elements are described in International patent publication No. WO2017/108516, this reference herewith being incorporated by reference in its entirety.

Figure 25:
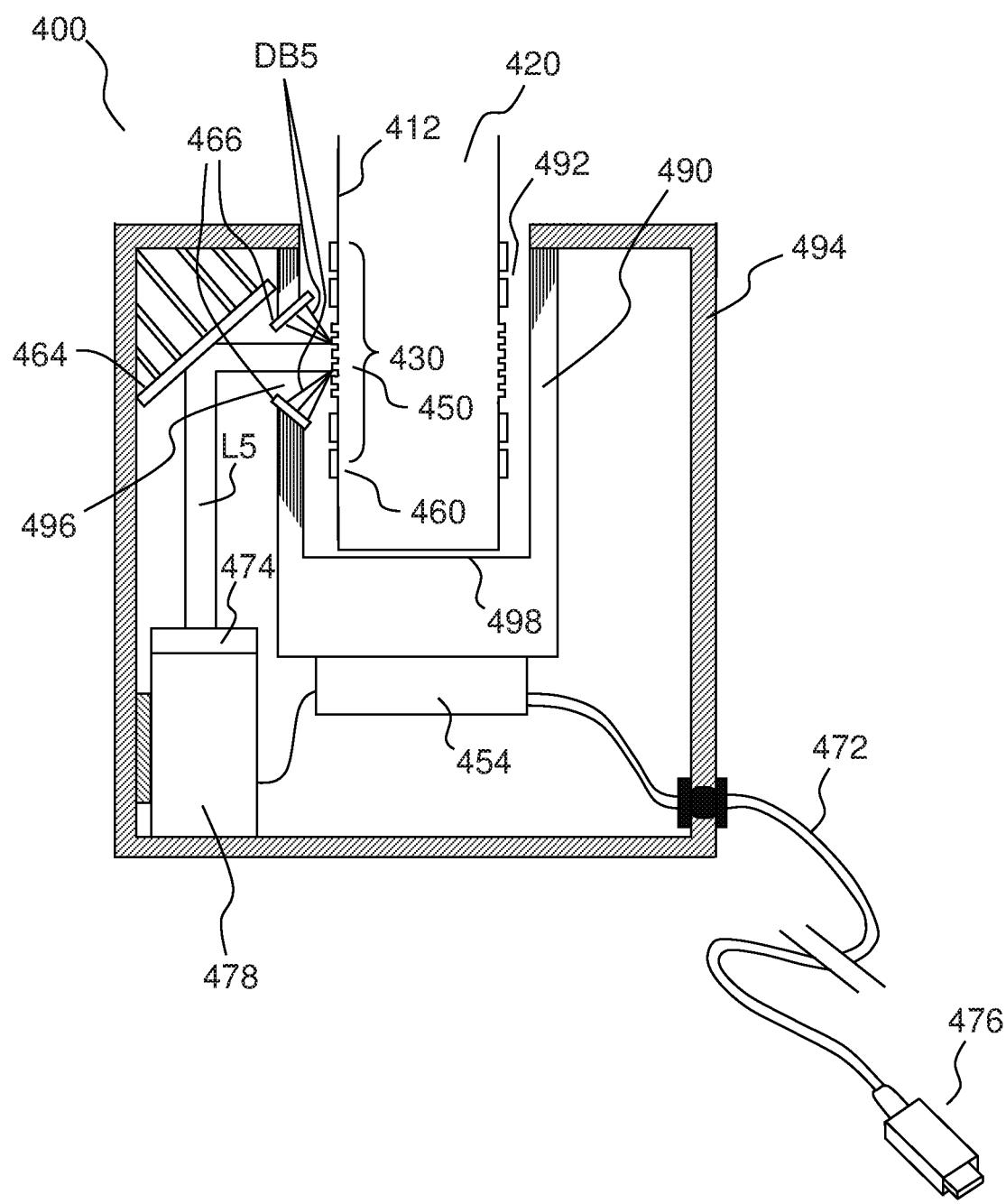
FIG. 25 shows a cross-sectional view of a device 400 for reading and decoding a code pattern that has a low visibility and is made of a diffractive pattern.

FIG. 25 shows a cross-sectional and schematic view of a device 400 for reading and decoding a diffractive code pattern 450 from a combined embossed pattern 430 that includes decorative embossed pattern 460 of a product 420, for example but not limited to a tobacco product. Reading device 400 is made of an outer enclosure 494 having an insert pocket 492 for accommodating the portion of product 420 that is equipped with a combined embossed pattern 430, having a diffractive code pattern 450 and a decorative embossed pattern 460. Insert pocket 492 can be designed such that product 420 can be inserted into pocket to fit the diameter of pocket 492, such that at least a part of diffractive code pattern 450 can be placed in front of a light opening 496 arranged in a side wall 490 of insert pocket 492. Also, product 420 can be put inside pocket 492 until an end of product 420 abuts against bottom wall 498 of pocket 492. An illumination device embodied as a coherent or partially-coherent light source 478, for example a laser diode, including optics 474 are arranged to emit a coherent light beam L5, for example laser light, in a direction of insertion of product 420. This light beam L5 is redirected by a mirror 464 arranged onside enclosure 494 so that the light beam passes through imaging opening 496 to illuminate combined embossed pattern 460 of a product 420. Diffractive code pattern 450 itself can be made as a wallpaper code, or can be made at several locations on product 420, to have redundant information that can be easily illuminated by light beam L5, for example such that at least one individual code of the diffractive code pattern 450 is illuminated by light beam L5.

At side walls of light opening 496, two or more optical sensors 466 are arranged in an oblique angle to face towards a location of combined embossed pattern 460, to capture a diffractive light DB5 that is caused by diffraction of the light beam off the diffractive code pattern 450 of combined embossed pattern 430. Optical sensors 466 and illumination device 478 are operatively connected to a controller device 454 that can turn the illumination on and off, and can capture and process data from optical sensors 466, so that the code that is embedded in diffractive pattern 450 of combined embossed pattern 430 can be read and decoded. For example, it is possible that upon insertion of product 420 into pocket 492 the illumination is turned on. This allows authenticating the diffractive pattern 450 of combined embossed pattern 430 along the cylindrical surface of product 420.

In FIG. 25, product 420 is shown where the combined embossed pattern 430 is arranged to wrap around product 420, for example a cylindrically-shaped tobacco product. However, it is also within the scope of this embodiment that the product 420 has any shape, for example a parallelepiped shape, square shape, bar shape, round shape, or other type of shape, and that the combined embossed pattern 430 is only applied to one side or several sides of the packaging of the product, or the product itself, without fully surrounding it. Also, while pocket 492 is shown having a U-shaped cross-section, it is also within the scope of the invention that the pocket 492 has a different shape and arrangement. For example, it is also possible that imaging opening 496 is arranged on a surface of device 400 without the provision of a specific pocket 492 for accommodating the product 420.

Moreover, controller device 454 of reading device 460 can be operatively connected to a computer, for example a personal computer, laptop, Macintosh computer, etc., for example via cable 472 and plug 476, for example but not limited to an Universal Serial Bus (USB) plug, or wirelessly, for example but not limited to via a Bluetooth interface. Thereby, product 420 can be used as a reading device or periphery of a product authentication system.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

The invention claimed is:

1. An embossing tool for embossing a combined embossing pattern into a packaging material, the combined embossing pattern including a decorative embossed pattern, and a plurality of embossed codes, comprising:
   a male and a female embossing device for cooperating with each other having embossing structures, the embossing structures configured to produce the combined embossing pattern into the packaging material in an embossing gap,
   wherein the embossing structures include first structures representing the plurality of embossed codes and second structures representing the decorative embossed pattern,
   wherein the decorative embossed pattern and the plurality of embossed codes produced by the embossing structures are arranged such that the plurality of embossed codes overlap or are interspersed with the decorative embossed pattern in a surface area, such that the plurality of embossed codes have a reduced detectability and visibility as compared to the decorative embossed pattern, and
   wherein the first structures of the embossing structures are arranged to form the plurality of embossed codes in a matrix-like arrangement into the packaging material.

2. The embossing tool of claim 1, wherein the first and second structures of the embossing structures are arranged such that the decorative embossed pattern fills out the surface area that is not occupied by one of the plurality of embossed codes of the packaging material.

3. The embossing tool of claim 1, wherein decorative areas formed by the decorative embossed pattern form a grid of lines around the embossed codes that are in the matrix-like arrangement.

4. The embossing tool of claim 1, wherein the plurality of embossed codes include a repetition of a single code along a longitudinal extension of the packaging material, and the decorative embossed pattern is arranged along the longitudinal extension of packaging material adjacent to the repetition of the single code along the longitudinal extension.

5. The embossing tool of claim 2, wherein the first and second structures are formed such that embossing projections of the decorative embossed pattern and embossing projections of the plurality of embossed codes have a same pitch.

6. The embossing tool of claim 1, wherein the plurality of embossed codes include a first embossed code and a second embossed code, the first embossed code occupying a first surface area and the embossed second code occupying a second surface area on the packaging material, and wherein
the first structures are formed such that the first and second surface areas overlap with each other.

7. The embossing tool of claim 1, wherein the plurality of embossed codes include a first embossed code and a second embossed code, information represented by the first and the second embossed codes being different, wherein a shape of embossing projections of the first structures that form the first embossed code are different than a shape of embossing projections of the first structures that form the second embossed code.

8. The embossing tool of claim 1, wherein the plurality of embossed codes include at least one of a data matrix code and/or a QR code.

9. The embossing tool of claim 1, wherein projections of the embossing structures have truncated tops.

10. A method for embossing a combined embossing pattern into a packaging material by an embossing device, the combined embossing pattern includes a decorative embossed pattern and a plurality of embossed codes,
wherein the embossing device includes a male and a female embossing device for cooperating with each other having embossed structures, the embossed structures configured to produce the combined embossing pattern into the packaging material in an embossing gap,
wherein the embossing structures include first structures representing the plurality of embossed codes and second structures representing the decorative embossed pattern,
the method comprising the step of:
embossing the packaging material with the combined embossed pattern including the decorative embossed pattern and the plurality of embossed codes, arranged such that the plurality of embossed codes overlap or are interspersed with the decorative embossed pattern in a surface area, such that the plurality of embossed codes have a reduced detectability and visibility as compared to the decorative embossed pattern,
wherein the first structures of the embossing structures are arranged to form the plurality of embossed codes in a matrix-like arrangement into the packaging material.

11. The method of claim 10, wherein in the step of embossing, decorative areas formed by the decorative embossed pattern form a grid of lines around the embossed codes that are in the matrix-like arrangement.

12. The method of claim 10, wherein in the step of embossing, the plurality of embossed codes include a repetition of a single code along a longitudinal extension of the packaging material, and the decorative embossed pattern is arranged along the longitudinal extension of packaging material adjacent to the repetition of the single code along the longitudinal extension.

13. The method of claim 10, wherein the plurality of embossed codes include a first embossed code and a second embossed code, the first embossed code occupying a first surface area and the second embossed code occupying a second surface areas on the packaging material,
and wherein
the first structures are formed such that the first and second surface areas overlap with each other.

14. A method for reading an embossed code that is embossed in a packaging foil, the embossed code representing code information, the method including the steps of:
illuminating an area of the embossed code by a first light source, the first light source having a first illumination direction arranged to create a first shadow pattern on the packaging foil, and capturing a first image from the first shadow pattern;
illuminating the area of the embossed code by a second light source, the second light source having a second illumination direction different from the first illumination direction, arranged to create a second shadow pattern on the packaging foil, and capturing a second image from the second shadow pattern;
calculating a representation of the embossed code based on the first and second images; and
reading the code information from the representation of the embossed code.

15. The method of claim 14, wherein the step of calculating the representation of the embossed code includes the calculation of edges for each of the first and second shadow pattern.

16. The method of claim 10, wherein the first and second structures of the embossing structures are arranged such that the decorative embossed pattern fills out the surface area that is not occupied by one of the plurality of embossed codes of the packaging material.

17. The method of claim 10, wherein the first and second structures are formed such that embossing projections of the decorative embossed pattern and embossing projections of the plurality of embossed codes have a same pitch.

18. The method of claim 10, wherein the plurality of embossed codes include a first embossed code and a second embossed code, information represented by the first and the second embossed codes being different, wherein a shape of embossing projections of the first structures that form the first embossed code are different than a shape of embossing projections of the first structures that form the second embossed code.

19. The method of claim 10, wherein the plurality of embossed codes include at least one of a data matrix code and/or a QR code.

20. The method of claim 10, wherein projections of the embossing structures have truncated tops.

\* \* \* \* \*